US011105630B2

(12) United States Patent
Kuisma et al.

(10) Patent No.: US 11,105,630 B2
(45) Date of Patent: Aug. 31, 2021

(54) VIBRATION-ROBUST MULTIAXIS GYROSCOPE

(71) Applicant: MURATA MANUFACTURING CO., LTD., Nagaokakyo (JP)

(72) Inventors: Heikki Kuisma, Helsinki (FI); Anssi Blomqvist, Helsinki (FI); Ville-Pekka Rytkönen, Klaukkala (FI)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 31 days.

(21) Appl. No.: 16/793,141

(22) Filed: Feb. 18, 2020

(65) Prior Publication Data

US 2020/0263990 A1  Aug. 20, 2020

(30) Foreign Application Priority Data

Feb. 15, 2019 (FI) ..................................... 20195117
Apr. 29, 2019 (FI) ..................................... 20195343

(51) Int. Cl.
*G01C 19/5712* (2012.01)

(52) U.S. Cl.
CPC ................. *G01C 19/5712* (2013.01)

(58) Field of Classification Search
CPC .................... G01C 19/5712; G01C 19/574
See application file for complete search history.

(56) References Cited

U.S. PATENT DOCUMENTS

| 5,635,640 A * | 6/1997 | Geen ............... G01C 19/5712 310/309 |
| 6,742,389 B2 * | 6/2004 | Nguyen ............ G01C 19/5719 73/504.12 |
| 7,421,897 B2 * | 9/2008 | Geen ............... G01C 19/574 73/504.12 |
| 8,844,357 B2 * | 9/2014 | Scheben ........... G01C 19/5747 73/504.12 |
| 10,371,521 B2 * | 8/2019 | Johnson ........... G01C 19/5656 |
| 2004/0211257 A1 * | 10/2004 | Geen ............... G01P 15/14 73/504.04 |
| 2004/0211258 A1 | 10/2004 | Geen |
| 2005/0081633 A1 * | 4/2005 | Nasiri ............... G01C 19/5712 73/514.29 |
| 2006/0272410 A1 | 12/2006 | Mao et al. |

(Continued)

FOREIGN PATENT DOCUMENTS

CN     108020220 A     5/2018

OTHER PUBLICATIONS

Finnish Search Report dated Sep. 17, 2019 corresponding to Finnish Patent Application No. 20195117.

(Continued)

*Primary Examiner* — David J Bolduc
(74) *Attorney, Agent, or Firm* — Squire Patton Boggs (US) LLP

(57) ABSTRACT

This disclosure describes a multiaxis gyroscope comprising a first proof mass quartet centered around a first quartet center point and a second proof mass quartet centered around a second quartet center point. In the primary oscillation mode all masses in each proof mass quartet move simultaneously either radially toward and away from the corresponding quartet center point, or in the same tangential direction in relation to the corresponding quartet center point.

12 Claims, 13 Drawing Sheets

(56) References Cited

U.S. PATENT DOCUMENTS

| | | | | |
|---|---|---|---|---|
| 2007/0214883 | A1* | 9/2007 | Durante | G01C 19/5712 73/504.04 |
| 2008/0092652 | A1* | 4/2008 | Acar | G01C 19/5712 73/504.02 |
| 2008/0282833 | A1* | 11/2008 | Chaumet | G01C 19/5747 74/5 R |
| 2009/0064780 | A1* | 3/2009 | Coronato | G01P 15/14 73/504.08 |
| 2009/0090200 | A1* | 4/2009 | Mita | G01C 19/574 74/5.7 |
| 2010/0294039 | A1 | 11/2010 | Geen | |
| 2011/0030474 | A1* | 2/2011 | Kuang | G01C 19/5712 73/504.16 |
| 2011/0061460 | A1* | 3/2011 | Seeger | G01C 19/5712 73/504.12 |
| 2011/0094301 | A1* | 4/2011 | Rocchi | G01C 19/574 73/504.08 |
| 2011/0167891 | A1* | 7/2011 | Geen | G01C 25/005 73/1.38 |
| 2011/0185813 | A1* | 8/2011 | Classen | G01C 19/5747 73/504.13 |
| 2012/0024056 | A1* | 2/2012 | Hammer | G01C 19/5712 73/504.02 |
| 2012/0048017 | A1 | 3/2012 | Kempe | |
| 2012/0279300 | A1* | 11/2012 | Walther | G01P 15/08 73/504.03 |
| 2013/0031977 | A1 | 2/2013 | Kempe | |
| 2013/0283908 | A1* | 10/2013 | Geen | G01C 19/5719 73/504.12 |
| 2014/0060184 | A1 | 3/2014 | Walther | |
| 2014/0182375 | A1* | 7/2014 | Kim | G01C 19/56 73/504.12 |
| 2015/0128700 | A1 | 5/2015 | Neul | |
| 2015/0211854 | A1* | 7/2015 | Ruohio | B81B 3/0043 73/504.12 |
| 2015/0330783 | A1* | 11/2015 | Rocchi | G01C 19/5747 73/504.12 |
| 2016/0025492 | A1* | 1/2016 | Rocchi | G01C 19/574 73/504.08 |
| 2016/0231115 | A1* | 8/2016 | Piirainen | G01C 19/5712 |
| 2016/0231116 | A1 | 8/2016 | Piirainen | |
| 2016/0231118 | A1* | 8/2016 | Trusov | G01C 19/574 |
| 2016/0313123 | A1* | 10/2016 | Valzasina | G01C 19/5719 |
| 2017/0184400 | A1 | 6/2017 | Valzasina et al. | |
| 2017/0268879 | A1* | 9/2017 | Andersson | G01C 19/574 |
| 2018/0031602 | A1* | 2/2018 | Huang | G01P 15/125 |
| 2018/0058853 | A1* | 3/2018 | Jia | G01C 19/5712 |
| 2018/0172446 | A1* | 6/2018 | Prikhodko | G01C 19/574 |
| 2018/0172447 | A1 | 6/2018 | Prikhodko et al. | |
| 2018/0292211 | A1* | 10/2018 | Besson | G01R 33/093 |
| 2019/0017823 | A1 | 1/2019 | Shao | |
| 2020/0200535 | A1* | 6/2020 | Kuisma | G01C 19/5712 |
| 2020/0263988 | A1* | 8/2020 | Blomqvist | G01C 19/5712 |

OTHER PUBLICATIONS

Finnish Search Report dated Jan. 27, 2020 corresponding to Finnish Patent Application No. 20195343.

Jul. 8, 2020 Search Report issued in European Patent Application No. 20156380.

* cited by examiner

| 11 | ⇨ | primary mode |
|---|---|---|
| 12 | ➡ | secondary mode in z-axis rotation |
| 13 | ⊕ ⊙ | secondary mode in x-axis rotation |
| 14 | ⊗ ⊙ | secondary mode in y-axis rotation |
Fig. 1
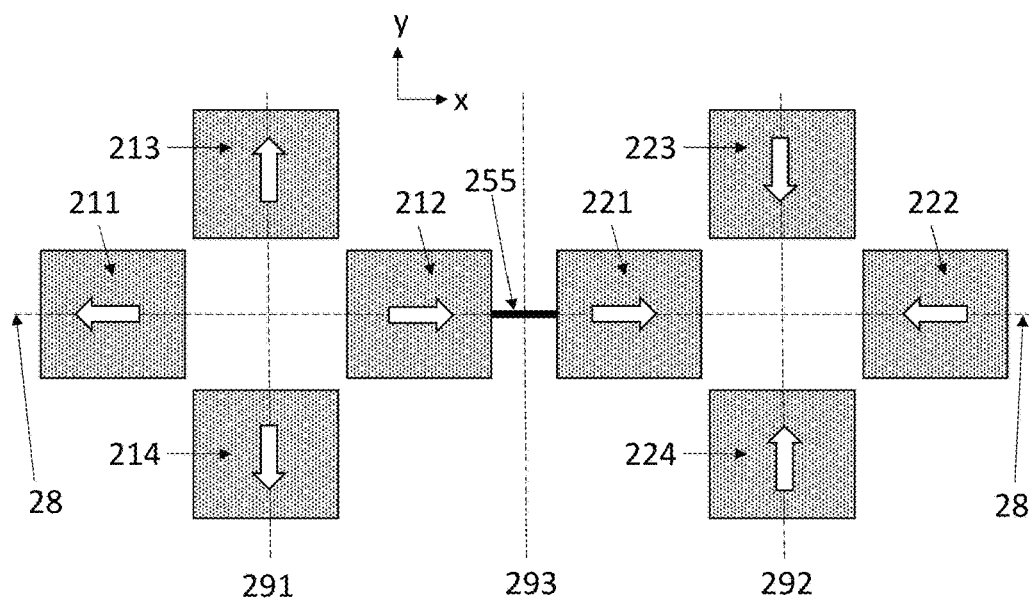
Fig. 2a
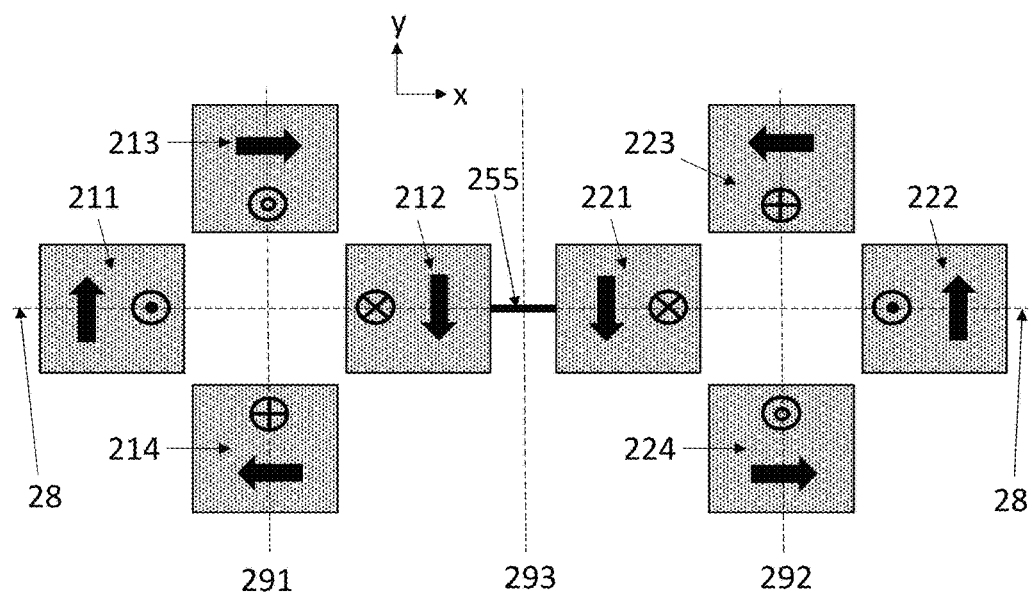
Fig. 2b

VIBRATION-ROBUST MULTIAXIS GYROSCOPE

FIELD OF THE DISCLOSURE

This disclosure relates to microelectromechanical gyroscopes, and more particularly to multiaxis gyroscopes where the same oscillating proof mass system can be used for measuring angular rotation about one, two or three mutually perpendicular rotation axes.

BACKGROUND OF THE DISCLOSURE

A general problem in microelectromechanical (MEMS) gyroscopes utilizing oscillating proof masses is that the masses should preferably be easily driven into a primary oscillation mode (which may also be called the drive oscillation mode) by drive actuators and also be easily set into a secondary oscillation mode (which may also be called the sense oscillation mode) by the Coriolis force, but still preferably not be moved by external disturbances. In other words, a gyroscope should preferably be unperturbed by linear and rotational vibrations imparted to it by surrounding elements at frequencies that are above the measurement frequency range, so that its output signal is determined only by the angular rotation rate which the gyroscope undergoes within the intended measurement frequency range. In automotive applications, for example, the disturbing vibrations typically lie in the frequency range 1 . . . 50 kHz, whereas the measurement frequency range is typically below 1 kHz.

A simple MEMS gyroscope may be constructed utilizing only one oscillating proof mass, but its output signal will typically be very noisy if external vibrations are present at a frequency close to the oscillating frequency of the gyroscope. Such a gyroscope is practical only at oscillation frequencies above 50 kHz where the sensitivity of the gyroscope may be very low and other disturbing effects, such as quadrature signals that arise from manufacturing imperfections, may become very prominent. It is known that a proof mass system where two or four proof masses oscillate in anti-phase can be made much more robust than a one-mass gyroscope because signal components arising from vibrations that induce cophasal movement of the two or four proof masses can be automatically cancelled to some degree via differential measurements. Further, if the cophasal resonant frequency can be brought above 50 kHz without affecting the differential resonant frequency, the gyroscope may be very robust to external vibrations since there is no resonance amplification for the disturbing vibrations.

Some MEMS gyroscopes are designed for measuring rotation rate about one axis which is perpendicular to the device substrate. Such gyroscopes may be called z-axis gyroscopes. Other MEMS gyroscopes are designed for measuring rotation rate about either of the two perpendicular axes which lie within the substrate plane. Such gyroscopes may be called x-axis gyroscopes and/or y-axis gyroscopes.

A multi-axis gyroscope can be created by incorporating two or three one-axis gyroscopes for different axes of rotation in the same device. This kind of multi-axis gyroscope will have two or three discrete oscillation frequencies, which will make the design of the electronic circuit difficult in order to avoid interference between the frequencies. Multiple sustaining and stabilizing circuits are then also needed for the primary oscillation. Some multiaxis MEMS gyroscopes are designed for measuring rotation rate about the x-, y-, and/or z-axis with the same set of oscillating proof masses to avoid the possible interference between different frequencies. It is difficult to make multiaxis gyroscopes based on a single oscillation frequency robust against external disturbances because all the proof masses must be given freedom to oscillate in many different directions in order to be free to assume any of the secondary oscillation modes associated with angular rotation about the three mutually orthogonal axes. External vibrations must still be suppressed in the partly flexible suspension and coupling arrangements which attach the proof masses to a fixed structure or cancelled in differential measurements. It is difficult to obtain robustness against external vibrations and isolation of all oscillation modes from energy leakage in multiaxis gyroscopes utilizing two or four proof masses.

Document US2015128700 discloses a multiaxis gyroscope with a proof mass system which utilizes eight masses symmetrically located around a common center so that in a radial configuration four masses are inner masses and four masses are outer masses or, in a stacked configuration, so that four masses are upper masses and four masses are lower masses. In either configuration it is not easy to conceive suspension and coupling arrangements which would allow all desired oscillation modes and suppress all undesired modes. No such arrangements are presented in US2015128700.

Document US2017184400 discloses a multiaxis gyroscope with a proof mass system which includes seven masses. Its usability and measurement accuracy is limited by a rigid inner mass at the center, which doesn't allow any operating modes with rotation of the inner proof mass. Allowing such rotation may be beneficial for creating out-of-plane vibration modes for x- and/or y-axis sensing, and at the same time enabling synchronization of the desired and suppression of the undesired in-plane modes. US2017184400 doesn't disclose any means for achieving these functions, which are essential for a high performance gyroscope with good robustness to external vibrations.

BRIEF DESCRIPTION OF THE DISCLOSURE

An object of this disclosure is to provide an apparatus for alleviating the above disadvantages and present multiaxis gyroscopes with proof mass systems that more efficiently promote desired modes and suppress undesired modes and allow advantageous operation modes and vibration modes of the proof masses to be used.

The object of the disclosure is achieved by an arrangement which is characterized by what is stated in the independent claims. The preferred embodiments of the disclosure are disclosed in the dependent claims.

The disclosure is based on the idea of utilizing a proof mass system which comprises two adjacent proof mass quartets. The primary oscillation mode is actuated so that each proof mass in a quartet oscillates, in relation to its quartet center point, in anti-phase compared to the corresponding proof mass in the other quartet.

An advantage of the arrangement presented in this disclosure is that desired oscillation modes can be easily synchronized and undesired modes can be suppressed, which makes the gyroscope robust against external vibrations. Side-by-side placement of two proof mass quartets allows easy interconnection between two proof masses in the middle of the gyroscope. Optionally, other proof masses in the proof mass quartets may be interconnected with a see-saw or lever structure.

BRIEF DESCRIPTION OF THE DRAWINGS

In the following the disclosure will be described in greater detail by means of preferred embodiments with reference to the accompanying drawings, in which FIG. 1 shows the symbols which illustrated primary and secondary oscillation modes in the following figures.

FIGS. 2a-2e illustrate the primary and secondary oscillation modes of a microelectromechanical gyroscope.

DETAILED DESCRIPTION OF THE DISCLOSURE

Figure 2C:
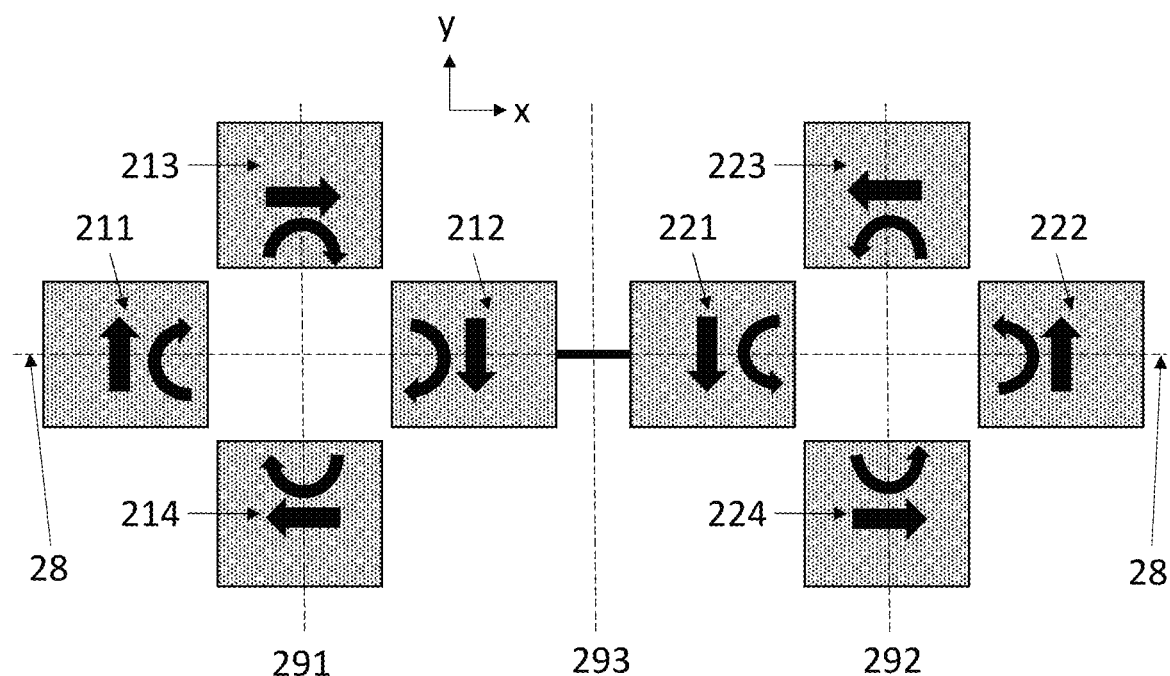

This disclosure describes a microelectromechanical gyroscope which comprises a first proof mass quartet and a second proof mass quartet in a device plane, with a corresponding first quartet center point and a corresponding second quartet center point which lie on a lateral axis.

The four proof masses which form the first proof mass quartet are in their rest position symmetrically arranged around the first quartet center point where the lateral axis crosses a first transversal axis orthogonally in the device plane. The four proof masses which form the second proof mass quartet are in their rest position symmetrically arranged around the second quartet center point where the lateral axis crosses a second transversal axis orthogonally in the device plane.

First and second proof masses in each proof mass quartet are aligned on the lateral axis in their rest position. Third and fourth proof masses in the first proof mass quartet are aligned on the first transversal axis in their rest position. Third and fourth proof masses in the second proof mass quartet are aligned on the second transversal axis in their rest position. The relative positions of the first, second, third and fourth proof masses in relation to the corresponding quartet center point are the same in both quartets.

The second proof mass in the first proof mass quartet is adjacent and mechanically coupled to the first proof mass in the second proof mass quartet.

The gyroscope further comprises one or more drive transducers for setting the first and second proof mass quartets into primary oscillating motion, and one or more sense transducers for detecting secondary oscillating motion of the first and second proof mass quartets which is induced by the Coriolis force if the gyroscope undergoes angular rotation.

The gyroscope further comprises a suspension arrangement for suspending the first and second proof mass quartets from a fixed support structure. The suspension structure is configured to accommodate the primary and secondary oscillating motion of the first and second proof mass quartets.

The drive transducers are configured to set all four proof masses in each proof mass quartet into primary oscillation in the device plane either in a first primary oscillation mode or in a second primary oscillation mode.

In the first primary oscillation mode, all proof masses in the first proof mass quartet move together radially in the device plane toward and away from the first quartet center point, and all proof masses in the second proof mass quartet move together radially in the device plane toward and away from the second quartet center point. All proof masses in the first proof mass quartet move radially in the device plane toward the first quartet center point when all proof masses in the second proof mass quartet move radially in the device plane away from the second proof mass quartet, and vice versa.

In the second primary oscillation mode, all proof masses in the first proof mass quartet move together tangentially in the device plane, clockwise and counter-clockwise in relation to the first quartet center point, and all proof masses in the second proof mass quartet move together tangentially in the device plane, clockwise and counter-clockwise in relation to the second quartet center point. All proof masses in the first proof mass quartet move tangentially in the device plane, clockwise in relation to the first quartet center point when all proof masses in the second proof mass quartet move tangentially in the device plane, counter-clockwise in relation to the second proof mass quartet, and vice versa.

The secondary oscillation modes of the first and second proof mass quartets include a z-axis secondary mode, an x-axis secondary mode, and/or a y-axis secondary mode. If the primary oscillation mode is the first primary oscillation mode, then, in response to rotation of the gyroscope about a z-axis which is perpendicular to the device plane, the z-axis secondary mode is the same as the second primary oscillation mode, and in response to rotation of the gyroscope about an x-axis which is parallel to the lateral axis, the x-axis secondary mode comprises motion where the two proof mass pairs formed by the third and fourth proof masses in each proof mass quartet oscillate tangentially out of the device plane, and in response to rotation of the gyroscope about a y-axis which is parallel to the first and second transversal axes, the y-axis secondary mode comprises motion where the two proof mass pairs formed by the first and second proof masses in each proof mass quartet oscillate tangentially out of the device plane.

If the primary oscillation mode of each proof mass quartet is the second primary oscillation mode, then, in response to rotation of the gyroscope about the z-axis, the z-axis secondary mode is the same as the first primary oscillation mode, and in response to rotation of the gyroscope about the x-axis, the x-axis secondary mode comprises motion where the two proof mass pairs formed by the first and second proof masses in each proof mass quartet oscillate tangentially out of the device plane, and in response to rotation of the gyroscope about the y-axis, the y-axis secondary mode comprises motion where the two proof mass pairs formed by the third and fourth proof masses in each proof mass quartet oscillate tangentially out of the device plane.

In this disclosure the device plane is illustrated and referred to as the xy-plane. The z-axis is perpendicular to the xy-plane. Linear and/or rotational motion or a combination thereof where the proof mass remains level in the device plane may be referred to as "in-plane" motion or "motion in the device plane", while linear and/or rotational motion or the combination thereof where the proof mass moves in a vertical direction may be referred to as "out-of-plane" motion, or "motion out of the device plane".

In this disclosure, rotation about an axis parallel to the z-axis will be referred to simply as rotation about the z-axis. Similarly, rotation about an axis parallel to the x-axis will be referred to as rotation about the x-axis, and rotation about an axis parallel to the y-axis will be referred to as rotation about the y-axis.

In this disclosure, "radial" oscillation refers to linear movement in the xy-plane, away from a central point and then back towards a central point. "Tangential" oscillation refers to movement in the xy-plane, xz-plane or yz-plane, along the tangent or the perimeter of an imaginary circle centered at a central point.

Tangential oscillation may in practice be a mixture of linear movement and rotation. The suspension arrangement will determine how the proof masses move tangentially. The oscillation amplitudes are typically small compared to the dimensions of the proof masses, which means that tangential oscillation will be substantially linear on the perimeter away from the central point even when it contains a rotational component. The same consideration also applies to out-of-plane oscillation. This oscillation may be a linear movement or a combination of rotational and linear movement which depends on the suspension arrangement. Out-of-plane oscillation may be tangential oscillation in the xz-plane or the yz-plane.

The out-of-plane oscillation of at least one proof mass pair in both the x-axis secondary mode and the y-axis secondary mode may comprise a rotational component. This may apply to all proof mass pairs in the first and second proof mass quartets. In a special case, the out-of-plane oscillation may be a rotary movement of a pair of opposite proof masses about the corresponding quartet center point.

Throughout this disclosure, the term "synchronize", and phrases such as "structure A synchronizes oscillation mode X", have the following meaning. Structure A constitutes a mechanical connection in a system of interconnected mass elements which should preferably oscillate in the desired mode X, but preferably not in an undesired mode Y. Increasing the rigidity or, in other words, decreasing the flexibility of a resonating system in a selected mode will increase the resonant frequency of the mode. Thus, high resonant frequency and rigidity may be considered equivalent. Structure A will be flexible in the oscillation mode X so that it will transfer some energy between the proof masses so that a single oscillation mode is created at the desired resonant frequency $F_X$, which is determined by the suspension arrangement associated with the interconnected mass elements and at least partially by the structure A. While complete suppression of the undesired mode Y may not be possible, it is beneficial to at least increase the rigidity and the resonant frequency $F_Y$ associated with the mode Y as much as possible while maintaining the flexibility and the resonant frequency $F_X$ associated with mode X at the desired value. Structure A exhibits a beneficial combination of rigidity for mode Y and flexibility for mode X, so that the presence of structure A improves the relationship between the resonance frequency $F_X$ of mode X and the resonance frequency $F_Y$ of mode Y in the system.

The presence of structure A may, for example, increase the ratio $F_Y/F_X$ and/or the difference $F_Y-F_X$. The reference state against which this improvement is measured may in some cases be the same system of mass elements without structure A. Structure A is in this case needed only for synchronization and suppression. In other cases, when structure A is also needed for supporting the weight of the mass elements and/or providing at least part of the spring function needed to resonate the mass system in mode X, the reference state against which the synchronization improvement is measured may be the same system of mass elements where A has been replaced with an alternative, standard structure B which only gives structural support and/or provides the spring function for the resonating the system in mode X.

In general, all suspension arrangements are optimized for support as well as flexibility in certain directions and rigidity in other directions. These three variables may conflict with each other, so optimization means finding a good compromise solution. All elements of the gyroscope may influence these compromises.

In the figures of this disclosure, the placement of the proof masses in the first and second proof mass quartets correspond to their rest positions. The oscillation directions of the proof masses in the different embodiments of this disclosure, and the phase relationships between the oscillations, will be illustrated using the symbols presented in FIG. 1. The white arrow shown on row 11 illustrates the primary oscillation mode which occurs in the device plane. The black arrow on row 12 illustrates the secondary mode which will occur in the device plane when the gyroscope undergoes rotation about the z-axis. The pair of symbols illustrated on row 13 will always be used together to illustrate the out-of-plane movement of a pair proof masses when the gyroscope undergoes rotation about the x-axis. The pair of symbols illustrated on row 14 will always be used together to illustrate the out-of-plane movement of a pair proof masses when the gyroscope undergoes rotation about the y-axis.

FIG. 2a illustrates a microelectromechanical gyroscope with a first proof mass quartet and a second proof mass quartet.

The gyroscope comprises a first proof mass of the first proof mass quartet 211, a second proof mass of the first proof mass quartet 212, a third proof mass of the first proof mass quartet 213, and a fourth proof mass of the first proof mass quartet 214. The gyroscope also comprises a first proof mass of the second proof mass quartet 221, a second proof mass of the second proof mass quartet 222, a third proof mass of the second proof mass quartet 223, and a fourth proof mass of the second proof mass quartet 224.

The first quartet center point is the point where the lateral axis 28 crosses the first transversal axis 291. The second quartet center point is the point where the lateral axis 28 crosses the second transversal axis 292. A third transversal axis 293 crosses the lateral axis between the second proof mass of the first proof mass quartet 212 and the first proof mass of the second proof mass quartet 221, as illustrated in FIG. 2a. The first transversal axis 291 and the second transversal axis 292 are separated from each other on the lateral axis 28. The second proof mass 212 of the first proof mass quartet and the first proof mass 221 of the second proof mass quartet are positioned between the first and second quartet center points, on opposite sides of the third transversal axis 293.

All proof masses may be suspended from a fixed support by partly flexible suspension arrangements (not illustrated in FIG. 2a) which allow oscillating movement. The gyroscope may also comprise capacitive or piezoelectric actuators (not illustrated in FIG. 2a) and a control unit which is configured to apply one or more drive voltage signals to the actuators. The control unit can thereby drive the primary oscillation of the proof masses. When the gyroscope undergoes rotation about the x-, y- and/or z-axis, the Coriolis force sets at least some proof masses into secondary oscillation.

The suspension arrangements may also synchronize certain oscillation modes. The gyroscope may further comprise coupling springs. Some proof masses may not be directly connected to actuators. Their primary oscillation may be indirectly actuated by coupling springs which transmit the motion of one proof mass the proof mass which is not directly connected to actuators. The coupling springs may also synchronize some oscillation modes.

The suspension arrangements may include central suspension arrangements formed near the quartet center points and peripheral suspension arrangements closer to the periphery of the gyroscope. Any central and peripheral suspenders which flexibly accommodate the desired oscillation modes can be used, and their shape may depend on the shape of the proof masses. Exemplary suspension arrangements will be illustrated below.

Oscillation Mode Examples

FIGS. 2a and 2b illustrate the first primary oscillation mode and the corresponding secondary oscillation modes. In this primary oscillation mode, each proof mass moves linearly in a radial direction in relation to the corresponding quartet center point. The phase of the primary oscillation of the first proof mass in each proof mass quartet in relation to the corresponding quartet center point is the same as the phase of the primary oscillation of the second, third and fourth proof masses in the same proof mass quartet in relation to the same quartet center point. In other words, all proof mass in a quartet move simultaneously toward and away from the corresponding quartet center point. In this oscillation mode, the movement of proof masses 212 and 221 along the x-axis may be synchronized with a coupling spring 255. The properties of the coupling spring 255 are described below with reference to FIGS. 12a-12c.

At the illustrated moment, all proof masses in the first proof mass quartet simultaneously move away from the first quartet center point, while all proof masses in the second proof mass quartet simultaneously move toward the second quartet center point. In the opposite half of the oscillation cycle, all proof masses in the first proof mass quartet will move toward the first quartet center point while all proof masses in the second proof mass quartet move away from the quartet center point. The oscillation mode illustrated in FIG. 2a may be called the beating heart mode.

FIG. 2b illustrates the corresponding secondary oscillation modes. In response to rotation of the gyroscope about the z-axis, the Coriolis force will oscillate all proof masses tangentially. The first primary oscillation mode induces a corresponding secondary oscillation mode where, in the illustrated phase, all proof masses in the first proof mass quartet oscillate in a clockwise direction, while all proof masses in the second proof mass quartet oscillate in a counter-clockwise direction.

Capacitive or piezoelectric measurement transducers may be used to determine in-plane oscillation amplitudes in the z-axis secondary oscillation mode. Differential measurement of electrical signals from similar transducers attached to each proof mass can be used for cancelling errors and crosstalk. In the following example of differential signal processing, rotational symmetry of proof mass-transducer geometry within a quartet is assumed (proof mass-transducers systems are copied, shifted and rotated in the xy-plane) and the electrical signals from the transducers are designated by the symbols of the corresponding proof masses. Within one quartet signals that are in same phase can be summed: 211+212+213+214 and 221+222+223+224. Since the two quartets are in anti-phase a difference of corresponding expressions can be taken leading finally to the total signal 211+212+213+214-221-222-223-224. A second transducer with opposite electrical polarity can be easily added to each proof mass. This allows increasing one additional level to the differential compensation. Also, it is possible to use a single transducer with opposite electrical polarity for any proof mass and the sign of the signal in the expression must be then changed accordingly.

In response to rotation of the gyroscope about the x-axis, the Coriolis force will oscillate the proof mass pairs (213+214 and 223+224) formed by the third and fourth proof masses in each proof mass quartet out of the device plane, as illustrated in FIG. 2b. The central and/or peripheral suspension and coupling springs which facilitate this oscillation will be illustrated below. Due to the anti-phase primary oscillation, proof mass pairs 213+214 and 223+224 oscillate about the lateral axis 28 in anti-phase.

In response to rotation of the gyroscope about the y-axis, the Coriolis force will oscillate the proof mass pairs (211+212 and 221+222) formed by the first and second proof masses in each proof mass quartet out of the device plane in mutual rotation about their respective transversal axes 291 and 292, as illustrated in FIG. 2b. Due to the anti-phase primary oscillation, this secondary oscillation about the transversal axes also occurs in anti-phase.

Capacitive or piezoelectric measurement transducers may be used to determine out-of-plane oscillation amplitudes in the x-axis and y-axis secondary oscillation modes. Differential measurement of electrical signals from similar transducers attached to each proof mass can be used for cancelling errors and crosstalk. In the following example of differential signal processing the electrical signals from the transducers are designated by the symbols of the corresponding proof masses. Within one quartet signals that are in opposite phase can be differenced: 211-212 and 221-222. Since the two quartets are in anti-phase, a difference of corresponding expressions can be taken, leading finally to the total signal 211-212-221+222 for detecting the signal produced by y-axis rotation. For x-axis rotation, a similar expression can be formed: 213-214-223+224. A second transducer with opposite electrical polarity can be added to each proof mass. This allows increasing one additional level to the differential compensation. Also, it is possible to use a single transducer with opposite electrical polarity for any proof mass and the sign of the signal in the expression must be then changed accordingly.

Figure 2D:
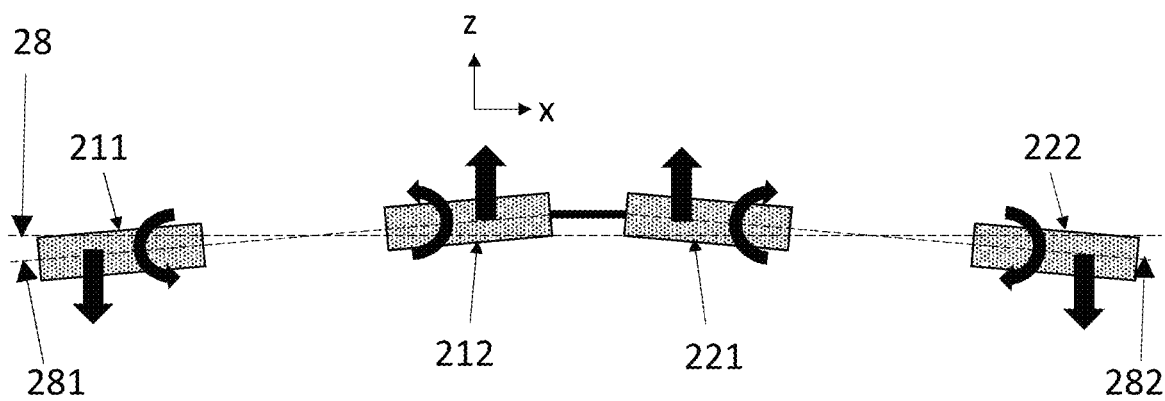
Figure 2E:
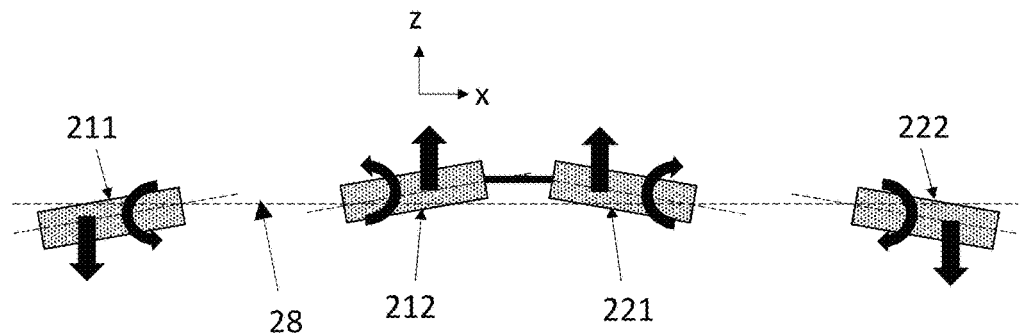

FIG. 2c illustrates in-plane tangential oscillation as a mixture of linear movement and rotation. FIG. 2d illustrates out-of-plane oscillation as a mixture of linear movement and rotation. The suspension arrangement and couplings between proof masses, which will be discussed in more detail below, will determine to which degree the rotational component will be present. It may be advantageous to have a combination of linear and rotational movement that produces a circular planetary movement of the proof mass around the center of the quartet, as illustrated in FIG. 2d where each proof mass pair 211+212 and 221+222 remains planar (as illustrated by axes 281 and 282, respectively) during out-of-plane oscillation. But it is also acceptable to have the rotation center of each proof mass close to the edge of the mass nearest to the center of the quartet, as illustrated in FIG. 2e where the pairs do not remain in the same plane in out-of-plane oscillation. These considerations on linear and rotational oscillation apply to all tangential and out-of-plane oscillation modes discussed in this disclosure. Any of them may be an arbitrary mixture of linear and rotational movement components with non-zero amplitude of the linear movement component. Pure rotational movement of the proof masses will not be properly coupled by Coriolis-force, but a proper combination of linear and rotational movement will decrease the total motion of the proof masses near the center of the quartet, which may be advantageous for synchronization of the radial mode and the out-of-plane modes, as will be discussed below.

Figure 3A:
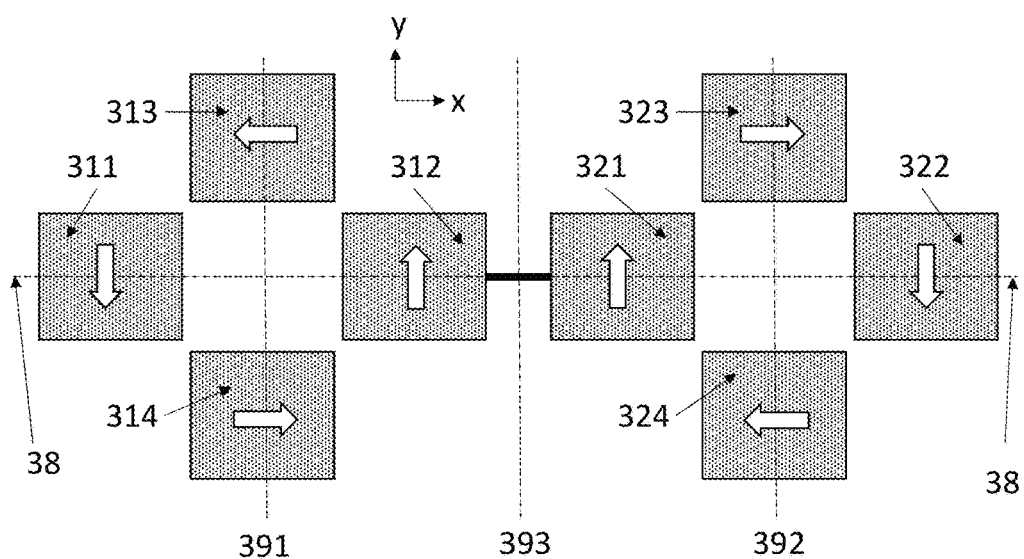
FIGS. 3a-3b illustrate the primary and secondary oscillation modes of a microelectromechanical gyroscope.
Figure 3B:
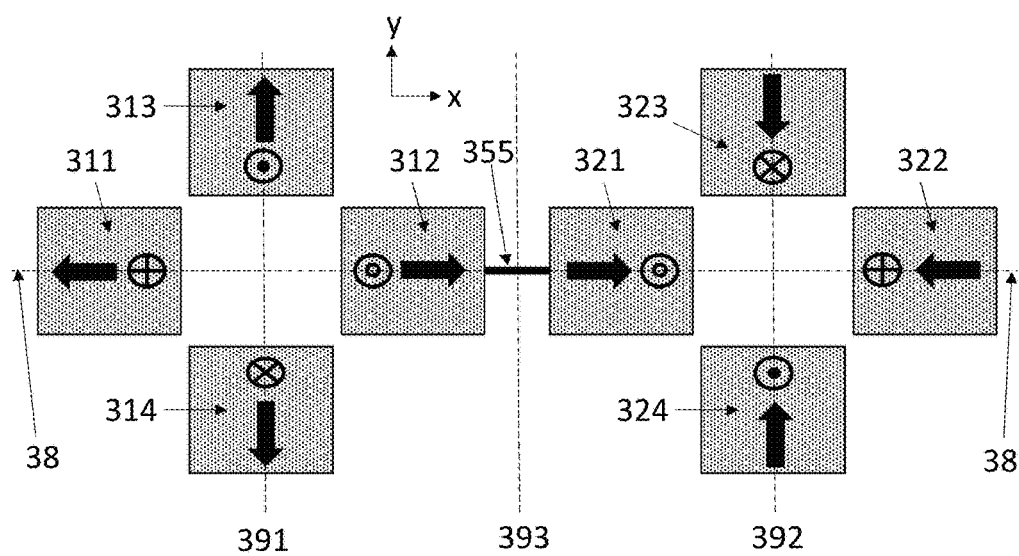

FIG. 3a illustrates a second primary oscillation mode. Reference numbers 311-314, 321-324, 355, 38 and 391-393 correspond to reference numbers 211-214, 221-224, 255, 28 and 291-293, respectively, in FIGS. 2a-2e. FIG. 3b illustrates the corresponding secondary oscillation modes.

In the second primary oscillation mode, each proof mass moves tangentially in relation to the corresponding quartet center point. Again, the oscillation phase (clockwise or counter-clockwise) of the first proof mass in each proof mass quartet in relation to the corresponding quartet center point is the same as the phase of the primary oscillation of the second, third and fourth proof masses in the same proof mass quartet in relation to the same quartet center point. The primary oscillation of the first proof mass quartet is in anti-phase compare to the primary oscillation of the second proof mass quartet.

All proof masses in the first proof mass quartet simultaneously move counter-clockwise around the first quartet center point, while all proof masses in the second proof mass quartet simultaneously move clockwise around the second quartet center point. In the opposite half of the oscillation cycle, all proof masses in the first proof mass quartet move clockwise while all proof masses in the second proof mass quartet move counter clockwise.

FIG. 3b illustrates the corresponding secondary oscillation modes. In response to rotation of the gyroscope about the z-axis, the Coriolis force will oscillate all proof masses radially. This time the anti-phase primary oscillation mode induces a corresponding anti-phase secondary oscillation mode where, in the illustrated phase, all proof masses in the first proof mass quartet oscillate outward, while all proof masses in the second proof mass quartet oscillate inward. The coupling spring 355 may in this case synchronize the movement of proof masses 312 and 321 in the z-axis secondary oscillation mode if it is stiff in the lateral direction. Other properties of the coupling spring 355 are described below with reference to FIGS. 12a-12c.

By comparing FIGS. 2a-2b and 3a-3b, it can be seen that the secondary oscillation mode generated by the first primary oscillation mode corresponds to the second primary oscillation mode, and the secondary oscillation mode generated by the second primary oscillation mode corresponds to the first primary oscillation mode Capacitive or piezoelectric measurement transducers may be used to determine in-plane oscillation amplitudes in the z-axis secondary oscillation mode. Differential measurement of electrical signals from similar transducers attached to each proof mass can be used for cancelling errors and crosstalk. In the following example of differential signal processing rotational symmetry of proof mass-transducer geometry within a quartet is assumed (proof mass-transducers systems are copied, shifted and rotated in the xy-plane) and the electrical signals from the transducers are designated by the symbols of the corresponding proof masses. Within one quartet signals that are in same phase can be summed: 311+312+313+314 and 321+322+323+324. Since the two quartets are in anti-phase a difference of corresponding expressions can be taken leading finally to the total signal 311+312+313+314-321-322-323-324. A second transducer with opposite electrical polarity can be easily added to each proof mass. This allows increasing one additional level to the differential compensation. Also, it is possible to use a single transducer with opposite electrical polarity for any proof mass and the sign of the signal in the expression must be then changed accordingly.

In response to rotation of the gyroscope about the x-axis, the Coriolis force will oscillate the proof mass pairs (311+312 and 321+322) formed by the first and second proof masses in each proof mass quartet out of the device plane, as illustrated in FIG. 3b. Due to the anti-phase primary oscillation, proof mass pairs 311+312 and 321+322 oscillate about their respective transversal axes 391 and 392 in anti-phase.

In response to rotation of the gyroscope about the y-axis, the Coriolis force will oscillate the proof mass pairs (313+314 and 323+324) formed by the third and fourth proof masses in each proof mass quartet out of the device plane, as illustrated in FIG. 3b. Due to the anti-phase primary oscillation, this secondary oscillation about the lateral axis also occurs in anti-phase.

Capacitive or piezoelectric measurement transducers may be used to determine out-of-plane oscillation amplitudes in the x-axis and y-axis secondary oscillation modes. Differential measurement of electrical signals from similar transducers attached to each proof mass can be used for cancelling errors and crosstalk. In the following example of differential signal processing the electrical signals from the transducers are designated by the symbols of the corresponding proof masses. Within one quartet signals that are in opposite phase can be differenced: 311-312 and 321-322. Since the two quartets are in anti-phase a difference of corresponding expressions can be taken leading finally to the total signal 311-312-321+322 for detecting the signal produced by x-axis rotation. For y-axis a similar expression can be formed: 313-314-323+324. A second transducer with opposite electrical polarity can be added to each proof mass. This allows increasing one additional level to the differential compensation. Also, it is possible to use a single transducer with opposite electrical polarity for any proof mass and the sign of the signal in the expression must be then changed accordingly.

In FIGS. 3a-3b only linear motion of the proof masses is illustrated. Rotational components of motion may exist also for the modes of FIGS. 3a-3b in addition to the linear components shown in the FIGS. 3a-3b, similar to FIGS. 2c-2e, and they may be advantageous over the pure linear modes as discussed above.

In combination, the primary and secondary oscillation modes illustrated in FIGS. 2a-2b and 3a-3b make the gyroscope very robust against external disturbances and energy flow out of the oscillation mode because the momentum of each moving proof mass on one side of the gyroscope is balanced by the opposite momentum of another proof mass on the other side of the gyroscope.

Proof Mass Quartet Geometries

All proof mass quartets have for illustrative purposes been presented as a collection of four square blocks in FIGS. 2a-3b, with an empty square-shaped area in the middle. It will usually be more advantageous to use an area-saving geometry where the proof masses are packed more densely within a rectangular boundary, a shape which is typically advantageous in silicon micro-technology.

Figure 4A:
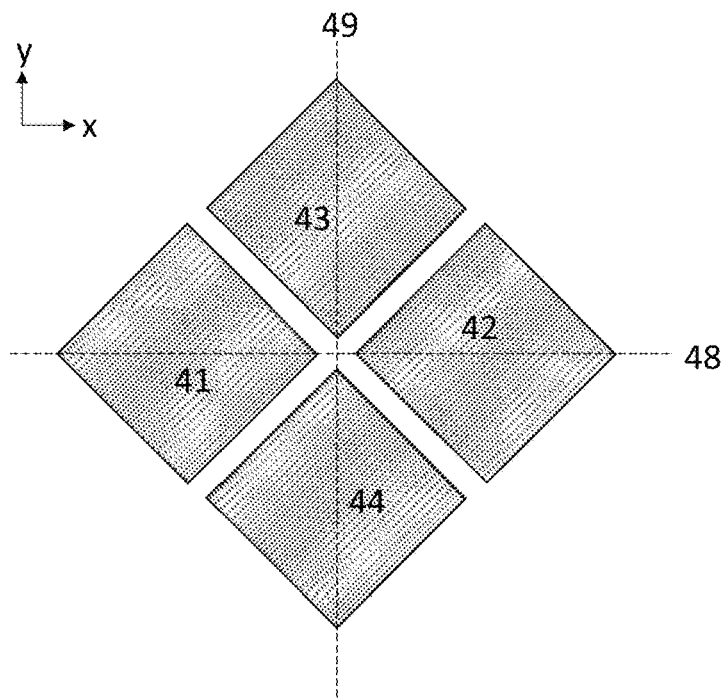
FIGS. 4a-4c illustrate proof mass geometries.

FIG. 4a illustrates a geometry where square-shaped proof masses 41-44 have been tilted 45 degrees with respect to the lateral axis 48 and transversal axis 49. This allows a denser grouping close to the quartet center point.

Figure 4B:
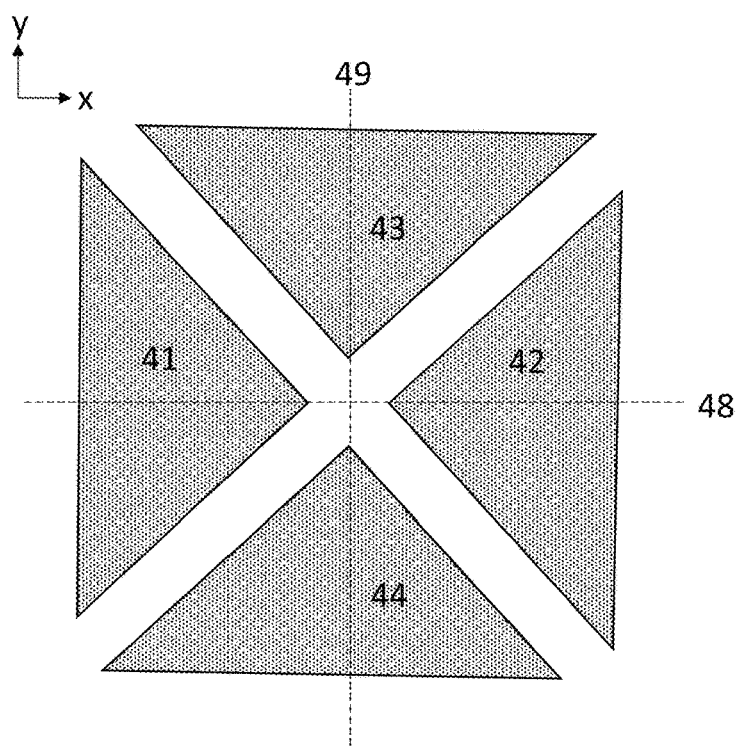

FIG. 4b illustrates another geometry which consumes less surface area for a given mass area. The proof masses 41-44 are shaped as right-angled triangles. More generally, the shape of each proof mass may be an isosceles triangle, and the tip each isosceles triangle may point toward the quartet center point as in FIG. 4b.

Figure 4C:
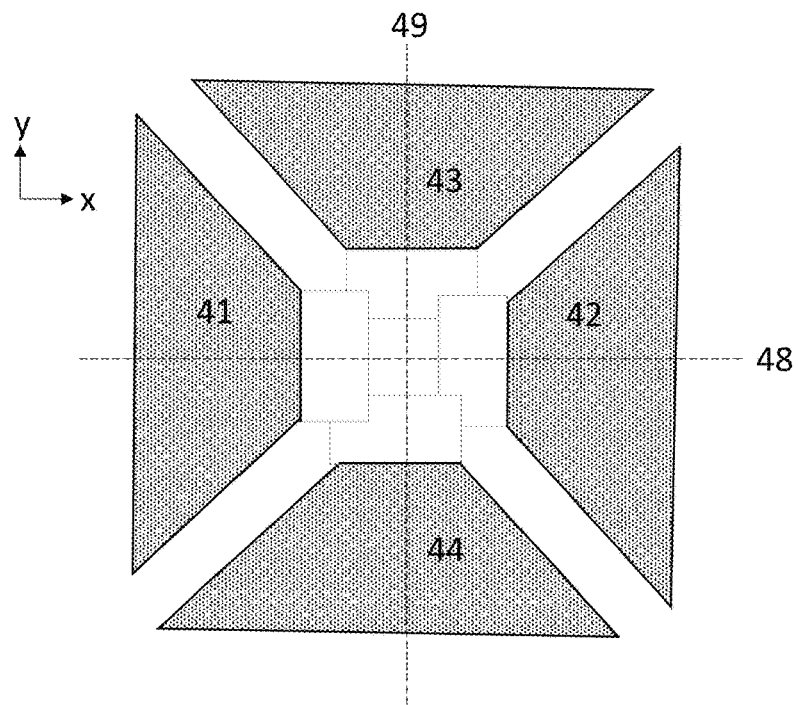

FIG. 4c illustrates a geometry where the proof masses 41-44 are shaped as truncated isosceles (in this case truncated right-angled) triangles where the tip of the triangle has been truncated. This shape can be beneficial if the suspension and coupling arrangements involve some springs which must be placed near the quartet center point.

Any of the geometries illustrated in FIGS. 4a-4c can be used in any embodiment presented in this disclosure. Many other proof mass shapes and arrangements can also be used. For example, the proof masses may contain cut-outs and/or openings to facilitate the placement of suspenders and/or synchronization structures and/or transducers.

Suspension and Coupling Examples

In general, the term "suspension" refers in this disclosure to an arrangement of one or more flexible springs, which may also be called suspenders, and which extend from a fixed support to a partly mobile element such as a proof mass. The place where the suspender is attached to the fixed support may be called an anchor point. The term "fixed" means that the support will be virtually unmovable for the oscillation modes of the proof masses and suspensions but will move when the sensor undergoes rotation as a whole. The flexibility of the suspenders renders the proof mass partly mobile, so that they it can be set into a primary oscillation mode by drive transducers at or close to the resonant frequency determined by the inertia of the proof mass and compliance of the suspension.

The term "coupling" refers in this disclosure to an arrangement of one or more flexible springs, which may be called coupling springs or synchronization springs, which stabilize the system of oscillating proof masses towards the desired synchronization. Coupling arrangements may also include rigid elements. The coupling function may also be embedded in the suspension. Vice versa, the coupling elements may be part of the suspension that determines the resonant frequency. For ease of reference, the general term "suspension arrangement" will in this disclosure cover both suspensions and couplings.

Suspension arrangements should flexibly accommodate, and preferably also synchronize, all the desired primary and secondary oscillation modes of the first and second proof mass quartets. Suspension arrangements should also preferably resist undesired oscillation modes, particularly undesired cophasal oscillations of two or more proof masses in the case where their anti-phase oscillation is the desired oscillation mode. Not all cophasal oscillations are undesired, but for every desired anti-phase oscillation mode discussed in this disclosure, there exists a corresponding cophasal oscillation mode which would disturb the measurement if its amplitude and frequency are too close to those of the desired anti-phase oscillation mode. The suspension arrangements should therefore preferably suppress those cophasal oscillation modes by shifting the resonant frequencies of those modes as high as possible.

Suspension arrangements for one proof mass quartet, which support the weight of the proof masses but render them partly mobile, and which may also synchronize the oscillation modes within the proof mass quartet, will be discussed first. In a gyroscope comprising two proof mass quartets, both proof mass quartets may be suspended and internally coupled with the same internal suspension arrangement. Both proof mass quartets may also be suspended and internally coupled with different internal suspension arrangements, but synchronization between the two proof mass quartets may be more difficult in this case.

Figure 5:
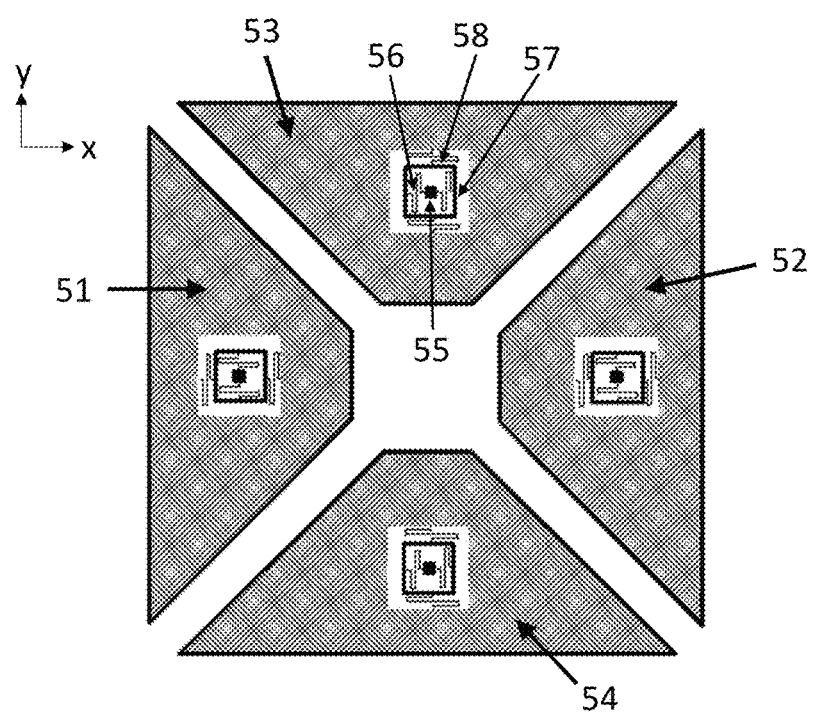
FIG. 5 illustrates a suspension arrangement.

FIG. 5 illustrates an example of a suspension arrangement which is applicable in all oscillation modes. Each proof mass comprises an opening and an anchor point 55 is arranged inside each opening. The suspension arrangement further comprises two inner meander springs 56 which extend from the anchor point to a gimbal frame 57 on opposite sides of the anchor point. The gimbal frame 57 surrounds the anchor point 55 and the inner meander springs 56. Two outer meander springs 58 extend from the gimbal frame to the surrounding proof mass on opposite sides of the gimbal frame 57. The outer meander springs 58 are orthogonal to the inner meander springs 56.

In the proof mass quartet illustrated in FIG. 5, the inner meander springs extend in a transversal direction within the first and second proof masses 51 and 52, while the inner meander springs extend in a lateral direction in third and fourth proof masses 53 and 54. Conversely, the outer meander springs extend in a lateral direction within the first and second proof masses 51 and 52, while the outer meander springs extend in a transversal direction in third and fourth proof masses 53 and 54.

The folded sections in the inner and outer meander springs 56 and 58 should be sufficiently long to allow out-of-plane translation and rotation of the proof mass.

Central Suspension Arrangements

It may often be beneficial to place an anchor point at each quartet center point and to suspend the corresponding proof mass quartet from said anchor point. Suspension arrangements around an anchor point located at a quartet center point may be called central suspension arrangements.

The suspension arrangement may comprise a first central suspension arrangement which suspends the first proof mass quartet from a first central anchor point located at the first quartet center point. The suspension arrangement may also comprise a second central suspension arrangement which suspends the second proof mass quartet from a second central anchor point located at the second quartet center point.

At least one of the first and second central suspension arrangements may be centered around the corresponding first or second central anchor point where a c1-axis crosses a c2-axis orthogonally. The c1-axis is either lateral or transversal. Said central suspension arrangement comprises a central gimbal element surrounded by a central synchronization element, wherein the central gimbal element comprises inner torsion springs which extend from the corresponding central anchor point to a gimbal frame and outer torsion springs which extend from the gimbal frame to the central synchronization element.

The central synchronization element comprises first and second c1-torsion bars which extend in opposite directions along the c1-axis to the two proof masses aligned on the c1-axis in the proof mass quartet which surrounds said central synchronization element. The central synchronization element comprises first and second c2-torsion bars which extend in opposite directions along the c2-axis to the two proof masses that are aligned on the c2-axis in the proof mass quartet which surrounds said central synchronization element.

Figure 6:
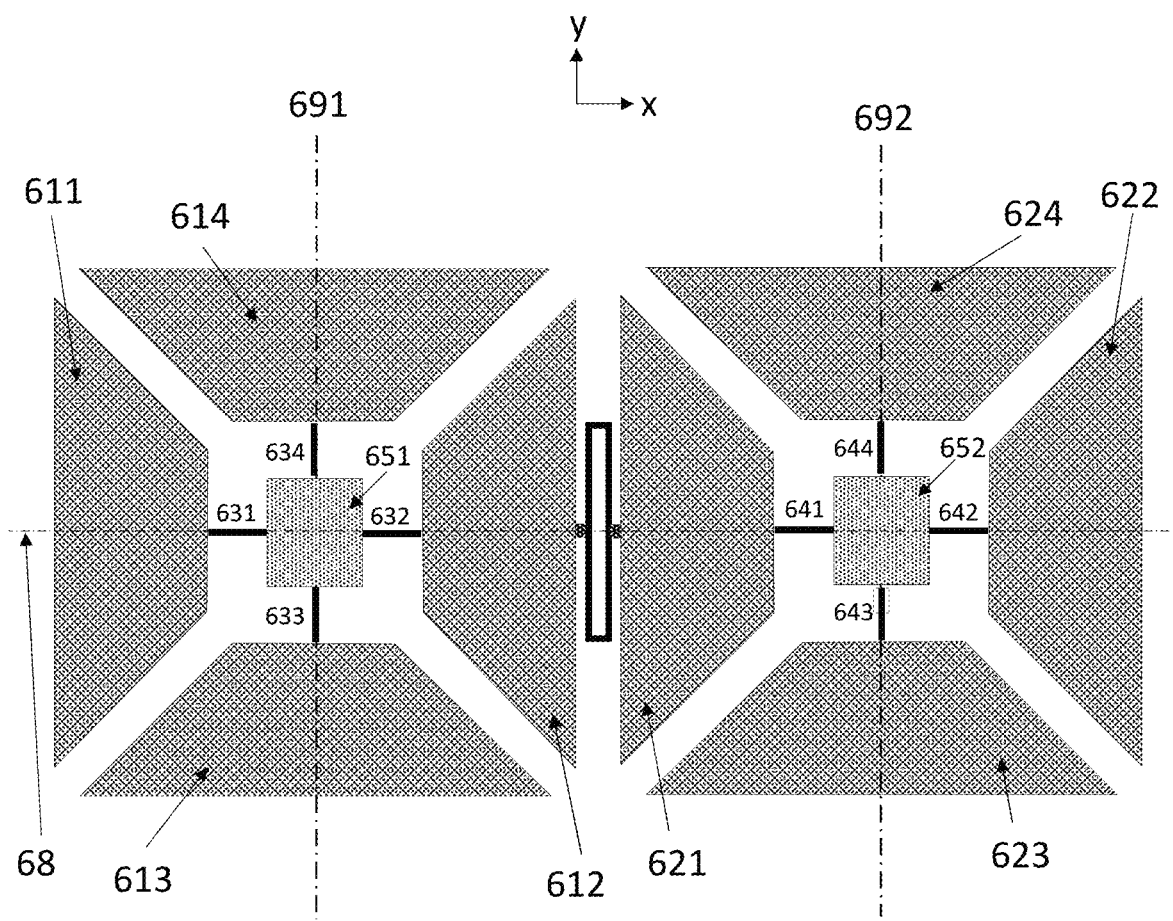
FIG. 6 illustrates first and second central suspension arrangements.

FIG. 6 illustrates an exemplary suspension arrangement which includes a first central suspension arrangement and a second central suspension arrangement. Reference numbers 611-614, 621-624, 68 and 691-692 correspond to reference numbers 211-214, 221-224, 28 and 291-292 in FIGS. 2a and 311-314, 321-324, 38 and 391-392 in FIG. 3a, respectively.

Since the central synchronization elements to be discussed below are reflection-symmetric with respect to both the lateral and transversal axis, but not symmetric under 90° rotation in the device plane, the "c1-axis" and "c2-axis" are defined as follows. The c1-axis may be either lateral or transversal, i.e. parallel to either the lateral axis 68 or to the transversal axes 691 and 692. If the c1-axis is lateral, then the c2-axis is transversal. If the c1-axis is transversal, the c2-axis is lateral. The central synchronization element operates in the same manner in both cases.

If the c1-axis is lateral, then the c1-torsion bars are 631 and 632 in the first central suspension arrangement and 641 and 642 in the second central suspension arrangement. The c2-torsion bars are in this case 633 and 634 in the first central suspension arrangement and 643 and 644 in the second central suspension arrangement. If, on the other hand, the c1-axis is transversal, then the c1-torsion bars are 633 and 634 in the first central suspension arrangement and 643 and 644 in the second central suspension arrangement. The c2-torsion bars are then 631 and 632 in the first central suspension arrangement and 641 and 642 in the second central suspension arrangement.

If the proof mass pair 611+612 exhibits a counter-clockwise tangential out-of-plane movement around the center of the quartet and the proof mass pair 621+622 exhibits a clockwise tangential out-of-plane movement around the center of the quartet as shown in FIG. 2d, then the torsion bars 633, 634, 643 and 644 will allow this without much restriction by twisting about the axes 691 and 692 while torsion bars 631, 632, 641 and 642 will remain essentially straight due to high rigidity for out-of-plane bending. Similarly, If the proof mass pair 613+614 exhibits a counter-clockwise tangential out-of-plane movement around the center of the quartet and the proof mass pair 623+624 exhibits a clockwise tangential out-of-plane movement around the center of the quartet then the torsion bars 631, 632, 641 and 642 will allow this without much restriction by twisting about the axis 68 while torsion bars 633, 634, 643 and 644 will remain essentially straight due to high rigidity for out-of-plane bending. For the in-plane tangential motion presented in FIG. 2c, all the torsion bars allow a rotary component by in-plane bending. Torsion bars should have a large height to width ratio, at least 2 and preferably 10 or more within the limits of the capability of the manufacturing technology. The length of the torsion bars should be as low as possible to allow high out-of-plane bending rigidity but high enough to keep the twisting torque low.

Figure 7:
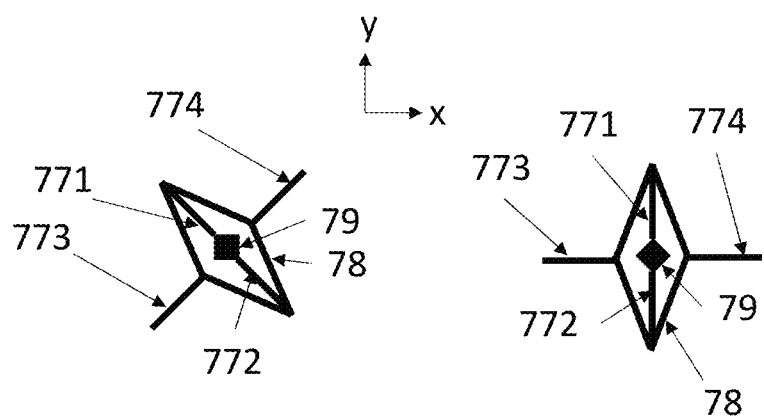
FIGS. 7-10c illustrate central parts of central suspension arrangements.

The first and second central suspension arrangements also comprise central parts 651 and 652 which have been illustrated merely with a box in FIG. 6. These central parts will now be discussed with reference to FIG. 7, and to FIGS. 8a-8c, 9a-9b and 10a-10c below. The central part typically comprises a central anchor point, illustrated as 79 in FIG. 7. The central part also comprises a central gimbal element which comprises inner torsion springs 771 and 772 which extend from the central anchor point 79 to a gimbal frame 78, and outer torsion springs 773 and 774 which extend from the gimbal frame 78 to the central synchronization element. The central synchronization element is not illustrated in FIG. 7.

The central gimbal element allows the surrounding central synchronization element, and the opposing proof mass pairs connected to the central synchronization element, to oscillate tangentially out of the device plane about either the lateral axis or the first/second transversal axis. The out-of-plane oscillation modes of FIGS. 2d-2e which contain a rotational component will be allowed by a central synchronization element having a gimbal element of FIG. 7 and torsion bars 631-634 of FIG. 6, FIG. 2d presents the ideal out-of-plane mode while the mode of FIG. 2e allows some out-of-plane flexibility of the central suspension arrangement, particularly of the torsion bars 631-634, that may be unavoidable with practical dimensions.

The gimbal frame 78 should be stiff for deformation and it may have any shape. The illustrated diamond shape consumes little surface area. The central gimbal element can be aligned so that the inner torsion springs 771 and 772 are transversal and the outer torsion springs 773 and 774 are lateral, or vice versa. This is illustrated on the right in FIG. 7. Alternatively, the inner and outer torsion springs may be oriented at an angle of 45° in relation to the lateral and transversal axes, as illustrated on the left in FIG. 7. Alternatively, the inner and outer torsion springs may be oriented at any angle with respect to the lateral and transversal axes that may be beneficial for the chosen synchronization element structure. Each of these orientations can be used with any central synchronization element illustrated in FIGS. 8a-8C, 9a-9b and 10a-10c below.

Figure 8A:
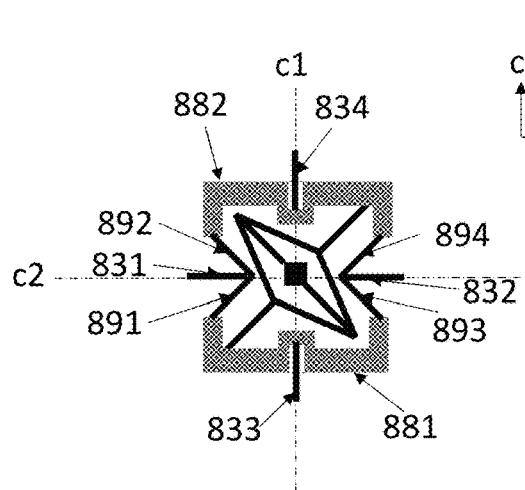
Figure 8B:
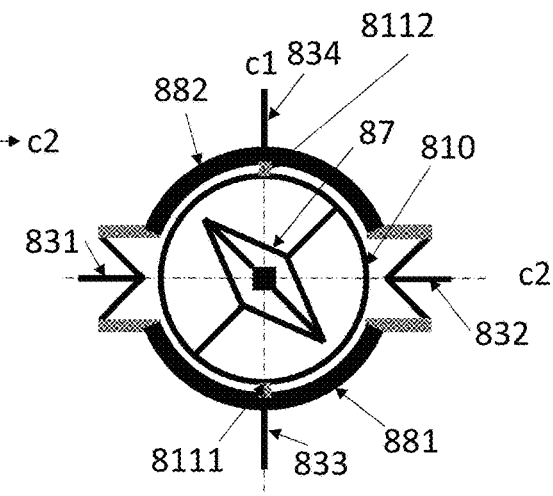
Figure 8C:
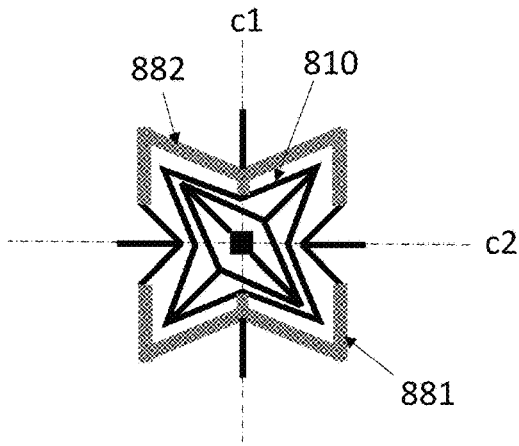

FIGS. 8a-8c illustrate a first example of a central synchronization element. The c1-axis and c2-axis cross the gyroscope center point, as illustrated in the figures. Depending on if the c1-axis is lateral or transversal, reference numbers 833 and 834 may correspond either to reference numbers 631 and 632 in FIG. 6, or to reference numbers 633 and 634 in FIG. 6.

The central synchronization element comprises first and second rigid bodies 881 and 882 aligned on the c1-axis on opposite sides of the central gimbal element so that the first end of the first rigid body 881 lies opposite to the first end of the second rigid body 882, and the second end of the first rigid body 881 lies opposite to the second end of the second rigid body 882. The outer torsion springs of the central gimbal element extend to the first and second rigid bodies 881 and 882, respectively, and the first and second c1-torsion bars 833 and 834 are attached to the first and second rigid bodies 881 and 882, respectively.

The central synchronization element also comprises a first flexure 891 which extends from the first (left) end of the first rigid body 881 to the first c2-torsion bar 831, and a second flexure 892 which extends from the first (left) end of the second rigid body 882 to the first c2-torsion bar 831, and a third flexure 893 which extends from the second (right) end of the first rigid body 881 to the second c2-torsion bar 832, and a fourth flexure 894 which extends from the second (right) end of the second rigid body 882 to the second c2-torsion bar 832.

The flexures 891-894 may, for example, be straight bars as in FIG. 8a, which extend away from the rigid body 881/882 at an angle. This angle may be 45° in relation to the c1-axis, or in the range 30°-60°. The flexures should extend towards the c1-axis, as illustrated in FIG. 8a, because this will ensure a proper direction for the motion of the proof masses attached to torsion bars 831 and 832. They will move towards the centre of the quartet when the proof masses attached to torsion bars 833 and 834 also move towards the centre of the quartet.

The synchronization element illustrated in FIG. 8a will synchronize the primary oscillation mode illustrated in FIG. 2a or the z-axis secondary oscillation mode illustrated in FIG. 3b by change of the angles between the flexures 891-894 and the rigid bodies and between the pairs of flexures 891/892 and 893/894. Ideally the flexures 891-894 would be levers connected by pivot joints to each other and to the rigid bodies 881/882 to allow the variation of the angles between them with small applied force. Pivot joints are, however, very difficult to manufacture in silicon microtechnology. The flexures 891-894 will perform approximately the same geometrical function by flexing, as levers would perform by rotating about the pivot joints. When all proof masses move inward toward the center point, the rigid bodies 881 and 882 push one end of each flexure toward the c2-axis. The other end of the flexure then pushes the c2-torsion bars 831 and 832 toward the c1-axis. When all proof masses simultaneously move outwards the rigid bodies will move outwards and the flexures will bend away from the c2 axis and the c2-torsion bars 831 and 832 will be pushed away from the c1-axis. The flexures thereby synchronize oscillation modes where all masses simultaneously move in the radial direction.

A differential mode, where proof masses attached to torsion bars 831 and 832 would move inwards while proof masses attached to torsion bars 833 and 834 would move outwards, and vice versa, is not allowed by the synchronization element of FIG. 8a. Also, the movement of the proof masses attached to c1-torsion bars 833 and 834 in the same direction, i.e. one mass moving towards the c2-axis and the other one away from c2-axis is not allowed due to rigid support by the central gimbal element. This provides insensitivity of the gyroscope output signal to vibrations in the c1-direction.

It is possible that the ends of the flexures 891 and 892 move towards the c2-axis while the ends of the flexures 893 and 894 move away from the c2-axis so that the angle between the rigid bodies 881 and 882 is changed but the average distance between them is not, i.e. the rigid bodies 881 and 882 are rotated, not displaced. This may allow the proof masses connected to torsion bars 831 and 832 to move in the same direction, one towards the c1-axis and the other one away from the c1-axis, which will make the gyroscope output signal sensitive to vibrations in the c2-direction.

A central synchronization frame 810, illustrated in FIG. 8b, may be included in the central synchronization element to mitigate this risk. The central synchronization frame 810 surrounds the gimbal frame 87, and the outer torsion springs of the central gimbal element extend to the central synchronization frame 810. As before, the central synchronization element comprises first and second rigid bodies 881 and 882 aligned on the c1-axis on opposite sides of the central synchronization frame. The central synchronization frame 810 is connected to the rigid bodies 881 and 882 with rigid connectors 8111 and 8112.

The synchronization frame 810 can deform into an elliptic shape in the direction of the c1- and c2-axes and will therefore allow the motion of the rigid bodies 881 and 882 towards the center and away from the center. The synchronization frame 810 can't deform to an elliptic shape at 45 degrees angle to c1- and c2-axes since the gimbal doesn't allow this. Consequently, also rotation of the synchronization frame at the locations of the connectors 8111 and 8112 is prevented, since this is part of the elliptical deformation prevented by the gimbal element. Rotation of the rigid bodies 881 and 882 about the connectors 8111 and 8112 is thus prevented by the synchronization frame 810. This arrangement resists the simultaneous movement of a pair of opposite proof masses connected to torsion bars 831 and 832 in the same linear direction. Hence the arrangement is not sensitive to linear vibrations. The synchronization frame and the rigid bodies do not necessarily have to be circular or rectangular. FIG. 8c illustrates an area-saving geometry where the synchronization frame 810 and the rigid bodies 881 and 882 have been fit tightly around the central gimbal element. In FIG. 8c the synchronization frame has a form of a four-pointed star that may undergo quasi-elliptic deformations. Other similar shapes that can undergo quasi elliptic deformations are also possible, such as polygons, polygons with rounded corners and four-pointed stars with rounded corners.

Figure 9A:
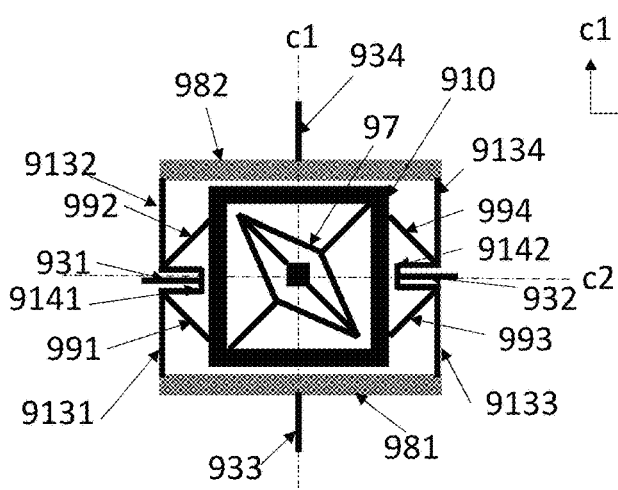

FIG. 9a illustrates an alternative central suspension arrangement. Reference numbers 910, 931-934, 97 and 981-982 correspond to reference numbers 810, 831-834, 87 and 881-882, respectively, in FIGS. 8a-8c.

The central synchronization element in FIG. 9a comprises a rigid central synchronization frame 910 which surrounds the gimbal frame 97, and the outer torsion springs of the central gimbal element extend to the central synchronization frame 910. The central synchronization element also comprises first and second rigid bodies 981 and 982 aligned on the c1-axis on opposite sides of the central synchronization frame 910. The first end of the first rigid body 981 lies opposite to the first end of the second rigid body 982, and the second end of the first rigid body 981 lies opposite to the second end of the second rigid frame 981.

The first end of the first rigid body 981 is joined to the first end of the second rigid body 982 with a first U-shaped flexure 9141 aligned on the c2-axis. The second end of the first rigid body 981 is joined to the second end of the second rigid body 982 with a second U-shaped flexure 9142 aligned on the c2-axis. The first c2-torsion bar 931 is attached to the bottom of the first U-shaped flexure 9141, and the second c2-torsion bar 932 is attached to the bottom of the second U-shaped flexure 9142.

The central synchronization element also comprises a first flexure 991 which extends from the central synchronization frame 910 to a first branch of the first U-shaped flexure 9141, and a second flexure 992 which extends from the central synchronization frame 910 to the second branch of the first U-shaped flexure 9141, and a third flexure 993 which extends from the central synchronization frame 910 to a first branch of the second U-shaped flexure 9142, and a fourth flexure 994 which extends from the central synchronization frame 910 to the second branch of the second U-shaped flexure 9142.

The flexures 991-994 may be straight bars as in FIG. 9a, which extend away from the central synchronization frame 910 at an angle. This angle may be 45° in relation to the c1-axis, or in the range 30°-60°. The central synchronization element may comprise a first push bar 9131 which extends from the first end of the first rigid body 981 to the first branch of the first U-shaped flexure 9141, and a second push bar 9132 which extends from the first end of the second rigid body 982 to the second branch of the first U-shaped flexure 9141. Correspondingly, the central synchronization element may comprise a third push bar 9133 which extends from the second end of the first rigid body 981 to the first branch of the second U-shaped flexure 9142, and a fourth push bar 9134 which extends from the second end of the second rigid body 982 to the second branch of the second U-shaped flexure 9142. Each push bar 9131-9134 may be parallel to the c1-axis, as illustrated in FIG. 9a.

The synchronization element illustrated in FIG. 9a will synchronize the primary oscillation mode illustrated in FIG. 2a or the z-axis secondary oscillation mode illustrated in FIG. 3b through the change of the angles of flexures 991-994 that will move the first and second U-shaped flexures 9141 and 9142 along the c2-axis. When all proof masses move inward toward the center point, the rigid bodies 881 and 882 move toward the c2-axis while central synchronization frame 910 remains stationary. The attachment points of the straight flexures 991-994 on the central synchronization frame 910 act as a fulcrum, and the U-shaped flexures 9141-9142 are pushed toward the center point as the movement of the rigid bodies 981 and 982 is transmitted to the opposite end of flexures 991-994.

On the other hand, outward movement of the proof masses attached to rigid bodies 981 and 982 pulls the U-shaped flexures away from the center point. The central synchronization element thereby synchronizes oscillation modes where all four proof masses simultaneously move in the radial direction, and resists oscillation where some masses would move inward while others move outward.

A differential mode, where proof masses attached to torsion bars 931 and 932 would move inwards while proof masses attached to torsion bars 933 and 934 would move outwards, and vice versa, is not allowed by the synchronization element of FIG. 9a. Also, the movement of the proof masses attached to c1-torsion bars 933 and 934 to the same direction, i.e. one mass moving towards the c2-axis and the other one away from c2-axis is not allowed due to rigid support by the central gimbal element. This provides insensitivity of the gyroscope output signal to vibrations in c1-direction.

There may again be a risk that external vibrations change the angle of the rigid bodies 981 and 982, so that first ends of the rigid bodies move away from the c2-axis while the second ends move towards the c2-axis or vice versa. This may allow the U-shaped flexures 9141 and 9142 and the attached proof masses to move in the same direction along the c2-axis, one towards the c1-axis and the other away from the c1-axis, which would make the gyroscope output signal sensitive to vibrations.

Figure 9B:
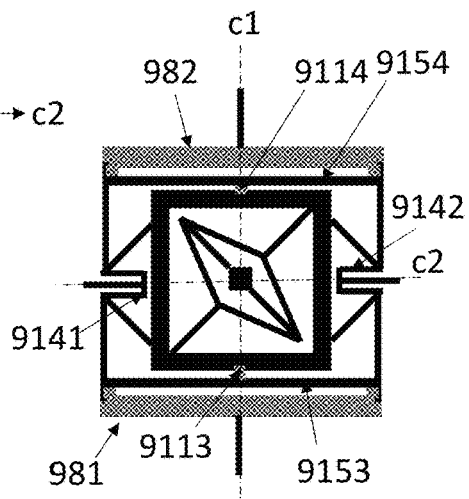

FIG. 9b illustrates a central synchronization element where rigid bodies 981 and 982 include bending elements 9153 and 9154, respectively. These bending elements are attached to the central synchronization frame 910 with connectors 9113 and 9114, respectively. Connectors 9113 and 9114 are aligned on the c1-axis.

The central synchronization frame 910 is connected rigidly to the center points of the bending elements 9153 and 9154. The bending elements 9153 and 9154 allow displacement of the rigid bodies 981 and 982 along the c1-axis by flexing to a C-shape. The bending elements resists changes in the angle between the rigid bodies 981 and 982 and the c1-axis because that would force them into an S-shape. Deformation into and S-shape requires eight times more force or torque than deformation into a C-shape. Therefore, this arrangement doesn't allow the rigid bodies 981 and 982 to rotate easily and thus the movement of the U-shaped flexures 9141 and 9142 in the same direction along the c2-axis is prevented. The arrangement will therefore not be sensitive to linear vibrations.

Figures 10A, 10B:
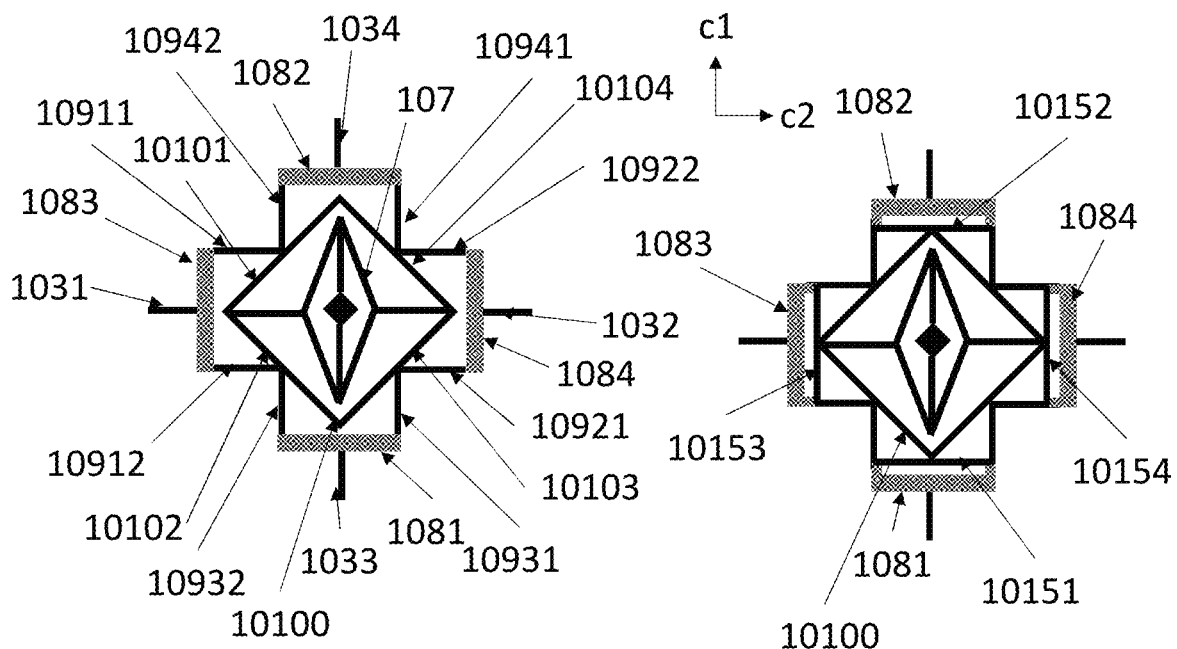

FIG. 10a illustrates an alternative central suspension arrangement. The central synchronization element comprises first and second rigid bodies 1081 and 1082 aligned on the c1-axis on opposite sides of the central gimbal element. The first end of the first rigid body 1081 lies opposite to the first end of the second rigid body 1082. The second end of the first rigid body 1081 lies opposite to the second end of the second rigid body 1082. The central synchronization element also comprises third and fourth rigid bodies 1083 and 1084 aligned on the c2-axis on opposite sides of the central gimbal element. The first end of the third rigid body 1083 lies opposite to the first end of the fourth rigid body 1084, and the second end of the third rigid body 1083 lies opposite to the second end of the fourth rigid body 1084.

The first and second c1-torsion bars 1033 and 1034 are attached to the first and second rigid bodies 1081 and 1082, respectively, and the first and second c2-torsion bars 1031 and 1032 are attached to the third and fourth rigid bodies 1083 and 1084, respectively.

The central synchronization element comprises a substantially quadratic flexible central synchronization frame 10100 which surrounds the gimbal frame 107, and the outer torsion springs of the central gimbal element extend along either the c1-axis or the c2-axis to two opposing corners in the quadratic flexible central synchronization frame 10100.

The central synchronization element further comprises four pairs of push bars 10911+10912, 10921+10922, 10931+10932 and 10941+10942. Each pair of push bars is parallel. The first pair 10911+10912 extends from the two opposing ends of the third rigid body 1083 to the midpoints of the adjacent sides 10101 and 10102 of the quadratic flexible central synchronization frame 10100. The second pair 10921+10922 extends from the two opposing ends of the fourth rigid body 1084 to the midpoints of the adjacent sides 10103 and 10104 of the quadratic flexible central synchronization frame 10100. Similarly, the third and fourth pairs 10931+10932 and 10941+10942 extend from the two opposing ends of the first and second rigid bodies 1081 and 1082, respectively, to the midpoints of the adjacent sides 10102/10103 and 10101/10104, respectively.

The synchronization element illustrated in FIG. 10a will synchronize the primary oscillation mode illustrated in FIG. 2a or the z-axis secondary oscillation mode illustrated in FIG. 3b through bending of the sides of the flexible central synchronization frame 10100. When all proof masses move inward toward the center point, each side 10101-10104 of this frame is bent at its midpoint inward toward the quartet center point. When all masses move outward, these sides are bent outward, away from the quartet center point. The synchronization element resists radial movements of two adjacent proof masses which are in anti-phase with respect to the center point, because one push bar will then try to pull the midpoint of the side 10101-10104 inward while the other pushes it outward.

Once again, undesired sensitivity to external vibrations may arise if the rigid bodies 1081-1084 are allowed to rotate about its centre point in addition or instead of being displaced along the c1- or c2-axes. For example, if rigid bodies 1083 and 1084 are rotated about their centre points, two of the attached push bars (for example 10911 and 10922) will lie closer to the c1-axis than the other two (10912 and 10921) or vice versa. The same is true with rigid bodies 1081 and 1082 and push bars 10932, 10942, 10931 and 941 and their distance to the c2-axis. FIG. 10b illustrates a central synchronization element where this risk has been reduced by attaching each corner of the flexible central synchronization frame 10100 to the corresponding rigid body with a bending element 10151-10154.

The flexible central synchronization frame 10100 is connected rigidly to the center points of the bending elements 10151-10154. The bending elements 10151-10152 allow displacement of the rigid bodies 1081-1084 along their alignment axis by flexing to a C-shape. The bending elements resist rotation of rigid bodies 1081-1084 about their center points because that would force them into an S-shape. The arrangement will therefore not be sensitive to linear vibrations.

Figure 10C:
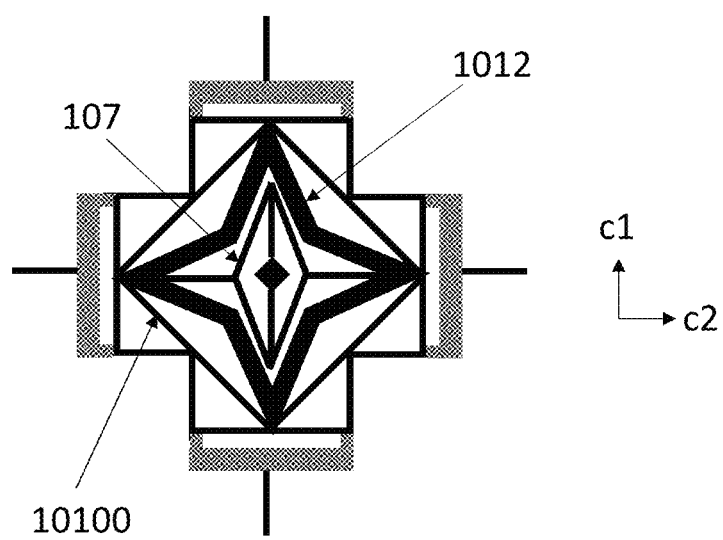

FIG. 10c illustrates an alternative embodiment where the flexible central synchronization frame 10100 surrounds a rigid central synchronization frame 1012. The rigid central synchronization frame surrounds the central gimbal element, so that the outer torsion springs of the gimbal element extend from the gimbal frame 107 to the rigid central synchronization frame. The rigid central synchronization frame 1012 is in turn connected to the corners of the flexible central synchronization frame 10100 as illustrated in the figure. The rigid synchronization frame will increase the rigidity of the synchronization element to higher order bending modes without substantially increasing the size of the synchronization element and without affecting the manufacturing process.

Peripheral Suspension Arrangements

The central suspension arrangements may in some cases be sufficient to carry the entire weight of the proof mass quartet and provide spring forces that will resonate the system of proof masses in the desired resonance modes and at the desired resonant frequencies. However, it is in most cases beneficial to place one or more anchor points also near the periphery of the proof mass quartet, and to suspend the proof mass quartet also from these peripheral anchor points. Suspension arrangements near the periphery of the proof mass quartet may be called peripheral suspension arrangements.

The suspension arrangement may therefore comprise a first peripheral suspension arrangement which suspends the first proof mass quartet from one or more first peripheral anchor points, and the suspension arrangement may also comprise a second peripheral suspension arrangement which suspends the second proof mass quartet from one or more second peripheral anchor points.

At least one of the first and second peripheral suspension arrangements may comprise four corner elements placed around the perimeter of the proof mass quartet symmetrically in relation to the gyroscope center point. Each pair of adjacent corner elements may be interconnected with one or more peripheral suspenders. Said one or more peripheral suspenders may be attached to the adjacent proof mass. Each corner element may be suspended from one or more peripheral anchor points by a radially flexible suspender.

Figure 11:
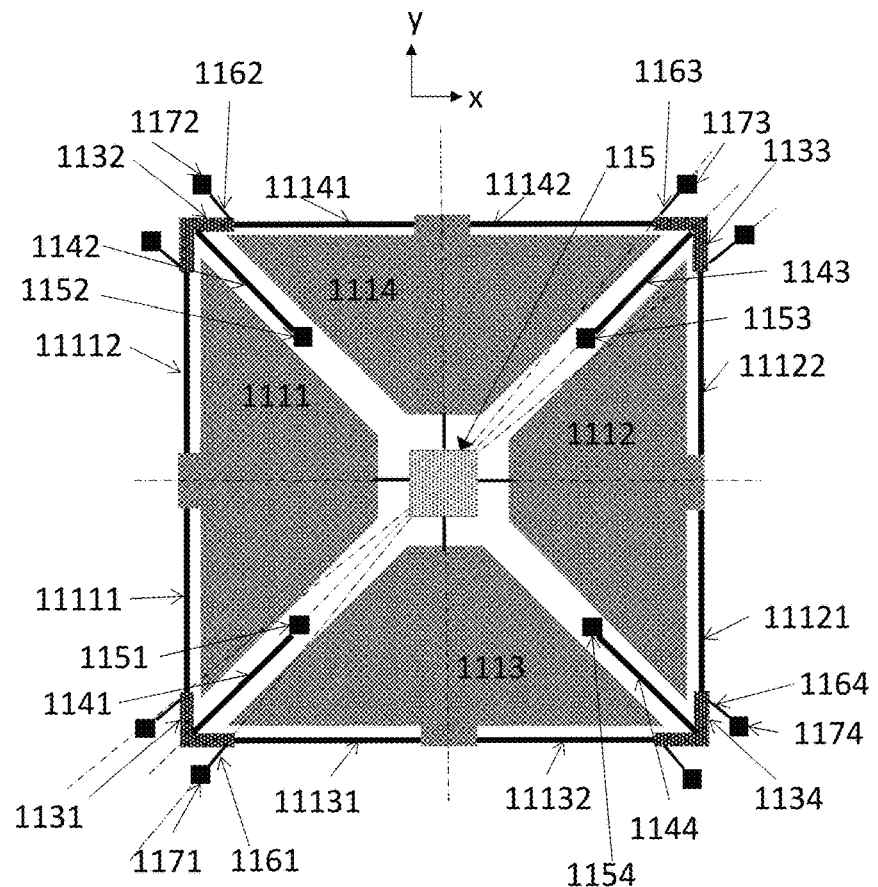
FIG. 11 illustrates a peripheral suspension arrangement.

FIG. 11 illustrates one example of a peripheral suspension arrangement which accommodates the oscillation modes illustrated in FIGS. 2a-2e and 3a-3b. Reference numbers 1111-1114 may correspond to reference numbers 211-214 or 221-224 in FIGS. 2a-2e or to reference numbers 311-314 or 321-324 in FIGS. 3a-3b. Reference number 115 corresponds to reference number 651 or 652 in FIG. 6.

The gyroscope illustrated in FIG. 11 comprises four corner elements 1131-1134 placed symmetrically around the proof masses and around the gyroscope center point. If the proof mass quartet together cover an approximately square square-shaped area, as in the shape examples shown in FIGS. 4a-4c, then one corner element may be located at each corner of this square. If the proof mass quartet covers an area of some other shape, for example the cross-type shape shown in FIGS. 2a-2e and 3a-3b, then the corner elements may be located at the corners of a square which encloses that shape. For any proof mass shape the corner elements are advantageously located symmetrically on axes that are oriented at an angle of 45° in relation to the lateral and transversal axes and that cross the center point of the proof mass quartet. The corner elements are rigid and they may have any shape.

Each pair of adjacent corner elements is interconnected with one or more tangential suspenders 11111-11112, 11121-11122, 11131-11132 and 11141-11142. Each tangential suspender is attached to the adjacent proof mass. FIG. 11 illustrates a device where, for example, a first tangential suspender 11111 extends from the first corner element to the first proof mass 1111, and a second tangential suspender 11112 extends from the second corner element 1132 to the first proof mass 1111. Alternatively, one long tangential suspender could extend from the first corner element 1131 to the second corner element 1132 and be attached to the first proof mass 1111 in the middle.

The tangential suspenders 11111-11112, 11121-11122, 11131-11132 and 111414-11142 are flexible in the radial direction, so that they flexibly accommodate radial motion on the proof masses. The tangential suspenders are also flexible in the out-of-plane direction, so that they accommodate the x-axis and y-axis secondary oscillation modes. Each corner element 1131-1134, however, is held in the device plane by a set of vertically rigid radial suspenders.

Radial suspender 1141-1144 are attached to inner anchor points 1151-1154, respectively, which lie between the proof masses. Radial suspenders 1161-1164, on the other hand, are attached to outer anchor points 1171-1174 which lie outside of the proof masses. As illustrated in FIG. 11, more than one radial suspender may be connected to each corner element 1131-1134, and one corner element may be connected to both inner and outer anchor points. Alternatively, only one radial suspender could be used.

In any case, the radial suspenders should preferably be accurately aligned on radial axes, such as the three radial axes which extend from the lower left corner to the upper right corner in FIG. 11. They can thereby accommodate the in-plane tangential oscillation modes illustrated in FIGS. 2b and 3a. The radial suspenders should be rigid in the vertical direction to resist rotational or linear movement of the corner elements 1131-1134, which might couple the x-axis secondary oscillation mode to the y-axis secondary oscillation mode and thereby mix x-axis and y-axis rotation sensing.

In addition to providing structural support, the peripheral suspension arrangement illustrated in FIG. 11 can synchronize the tangential oscillation mode illustrated in FIGS. 2b and 3a since the radial suspenders can store and release elastic energy when all masses simultaneously move tangentially. The radial suspenders and the corner elements resist movements where two adjacent proof masses would move in opposite directions.

The radial suspenders resist all in-plane movement of the proof masses, except the tangential movement which they allow by bending, and the radial beating heart movement, which the tangential suspenders accommodate by in-plane bending in the middle. The radial suspenders also prevent all out-of-plane movement except the rotary movement of pair of opposing proof masses (1111+1112 or 1113+1114), which the tangential suspender accommodate through out-of-plane bending to a C-shape. Rotation of the proof masses 1111 and 1112 about the x-axis, and rotation of the proof masses 1113 and 1114 about the y-axis is resisted because it would force the tangential suspenders to bend into an S-shape. As mentioned earlier, deforming into an S-shape requires 8 times more force or torque than deforming into a C-shape.

Synchronization Between Proof Mass Quartets

Figure 12A:
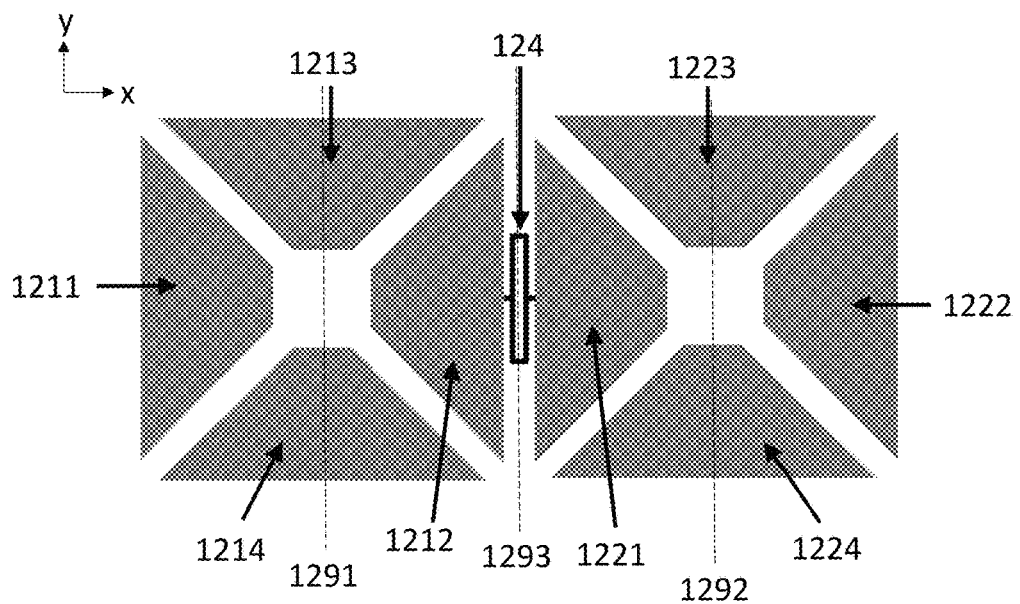
FIGS. 12a-12c illustrate a synchronization arrangement between the first and second proof mass quartets.

FIG. 12a illustrates an example of a synchronization arrangement between the first and second proof mass quartets. Reference numbers 1211-1214 and 1221-1224 correspond to reference numbers 211-214 and 221-224 in FIGS. 2a-2e and to reference numbers 311-314 and 321-324 in FIGS. 3a-3b, respectively. Reference number 124 corresponds to reference numbers 255 and 355 in FIGS. 2a and 3b, respectively.

A coupling spring 124 is attached between proof masses 1212 and 1221. The spring 124 transfers motion in lateral, transversal and out-of-plane directions from proof mass 1212 to 1221 and vice versa, so that the primary oscillation mode, the z-axis secondary oscillation mode and one the out-of-plane secondary oscillation modes of proof mass pairs 1211+1212 and 1221+1222 are effectively synchronized. The movement of proof mass pairs 1213+1214 and 1223+1224 is not directly synchronized by the coupling spring 124, but the synchronization imparted by the spring 124 can be indirectly transmitted from the pairs 1211+1212 to the pairs 1213+1214 and 1223+1224 either via the central synchronization elements described above, or by the peripheral synchronization elements which will be described below.

The coupling spring 124 may be relatively rigid for linear movement in the transversal direction, so that transversal anti-phase movement between 1212 and 1221, where one mass could move in the positive y-direction while the other moves in the negative y-direction, is prevented. The coupling spring 124 may be flexible for rotation about the z-axis, allowing an in-plane tilt angle between the proof masses 1212 and 1221. The spring may be also flexible for rotation about the third transversal axis 1293, so that it allows out-of-plane rotational movement of the proof masses by allowing a tilt angle between them but doesn't allow anti-phase out-of-plane movement between 1212 and 1221.

Figure 12B:
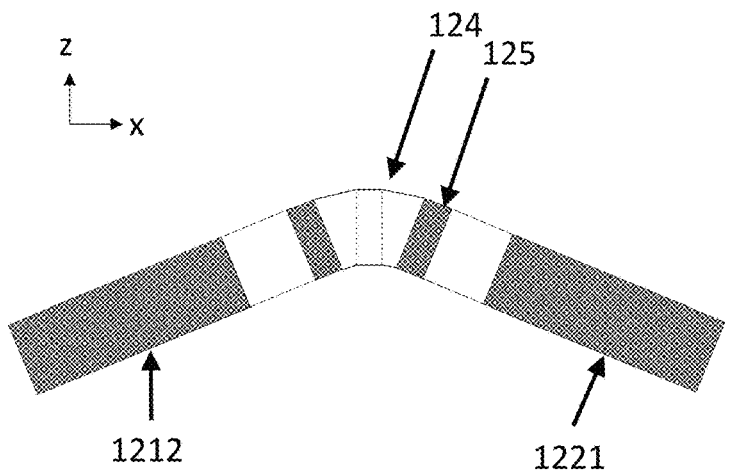
Figure 12C:
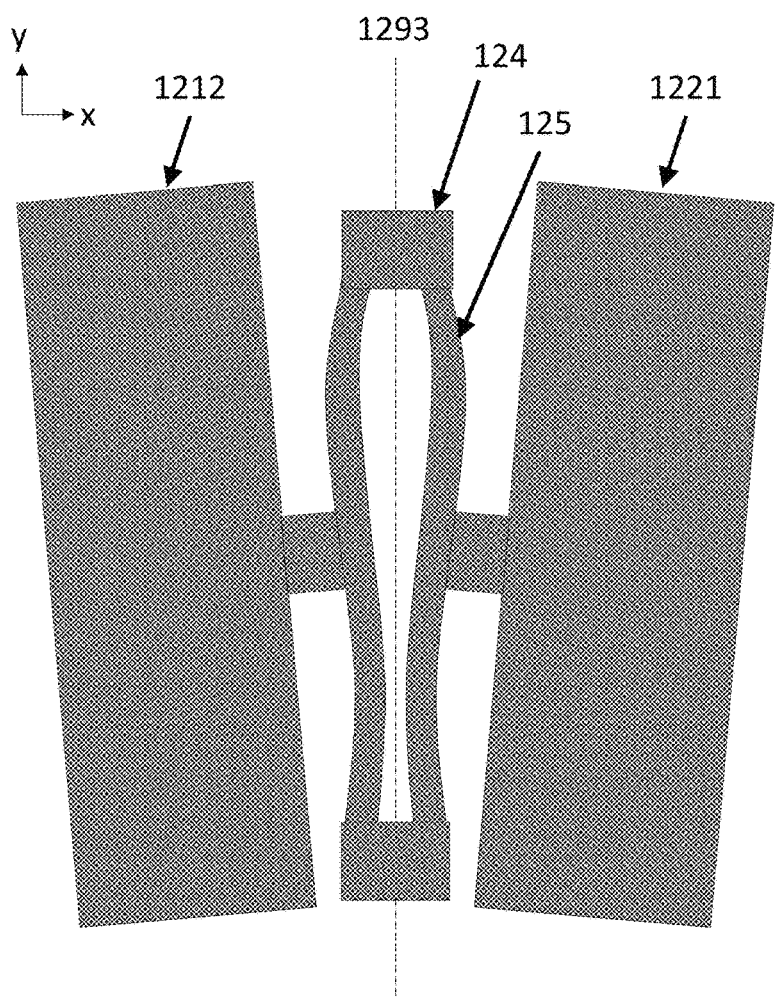

FIGS. 12b and 12c illustrate a possible structure for the coupling spring 124 as a cross section and as an in-plane view. Spring 124 may contain at least one bar 125 in the direction of the transversal axis 1293, which has in-plane flexibility and torsional flexibility, but which is rigid for out-of-plane bending. One of the proof masses 1212 or 1221 is attached to the mid-point of the bar 125 and the other proof mass to the ends of the bar. Preferably the spring 124 is symmetrical, containing two bars 125 attached to each other at the ends and to the proof masses at the mid-points. Other spring constructions may also be used.

In general, the second proof mass in the first proof mass quartet may be mechanically coupled to the first proof mass in the second proof mass quartet by at least one coupling spring 124 aligned on the third transversal axis 1293 in the device plane.

The at least one coupling spring 124 may allow the second proof mass 1212 in the first proof mass quartet and the first proof mass 1221 in the second proof mass quartet to simultaneously rotate in opposite out-of-plane directions about corresponding transversal axes. These corresponding transversal axes may be the first and second transversal axes, so that 1212 rotates about the first transversal axis while 1221 rotates about the second transversal axis, or they may be transversal axes which pass through the proof masses 1212 and 1221, respectively.

The coupling spring 124 may also allow the second proof mass 1212 in the first proof mass quartet and the first proof mass 1221 in the second proof mass quartet to simultaneously rotate in opposite in-plane directions about corresponding vertical axes. These corresponding vertical axes may be the vertical axes which cross the first and second quartet center points, so that 1212 rotates about the vertical axis which crosses the first quartet center point while 1221 rotates about the vertical axis which crosses the second quartet center point, or they may be vertical axes which pass through the proof masses 1212 and 1221, respectively.

The at least one coupling spring 124 may further allow simultaneous cophasal linear translation of the second proof mass 1212 in the first proof mass quartet and the first proof mass 1221 in the second proof mass quartet in a direction parallel to the lateral axis, parallel to any transversal axis, or parallel to any vertical axis.

The at least one coupling spring 124 may further resist the simultaneous rotation of the second proof mass 1212 in the first proof mass quartet and the first proof mass 1221 in the second proof mass quartet in the same out-of-plane direction about corresponding transversal axes. These corresponding transversal axes may be the first and second transversal axes, so that 1212 rotates about the first transversal axis while 1221 rotates about the second transversal axis, or they may be transversal axes which pass through the proof masses 1212 and 1221, respectively.

The at least one coupling spring 124 may further resist the simultaneous rotation of the second proof mass 1212 in the first proof mass quartet and the first proof mass 1221 in the second proof mass quartet to the same in-plane direction about corresponding vertical axes. These corresponding vertical axes may be the vertical axes which cross the first and second quartet center points, so that 1212 rotates about the vertical axis which crosses the first quartet center point while 1221 rotates about the vertical axis which crosses the second quartet center point, or they may be vertical axes which pass through the proof masses 1212 and 1221, respectively.

The at least one coupling spring 124 may further resist simultaneous anti-phase linear translation of the second proof mass 1212 in the first proof mass quartet and the first proof mass 1221 in the second proof mass quartet in opposite directions parallel to any transversal axis, or parallel to any vertical axis.

Finally, the at least one coupling spring 124 may also resist simultaneous rotation of the second proof mass in the first proof mass quartet and the first proof mass in the second proof mass quartet in opposite directions about the lateral axis.

Figure 13A:
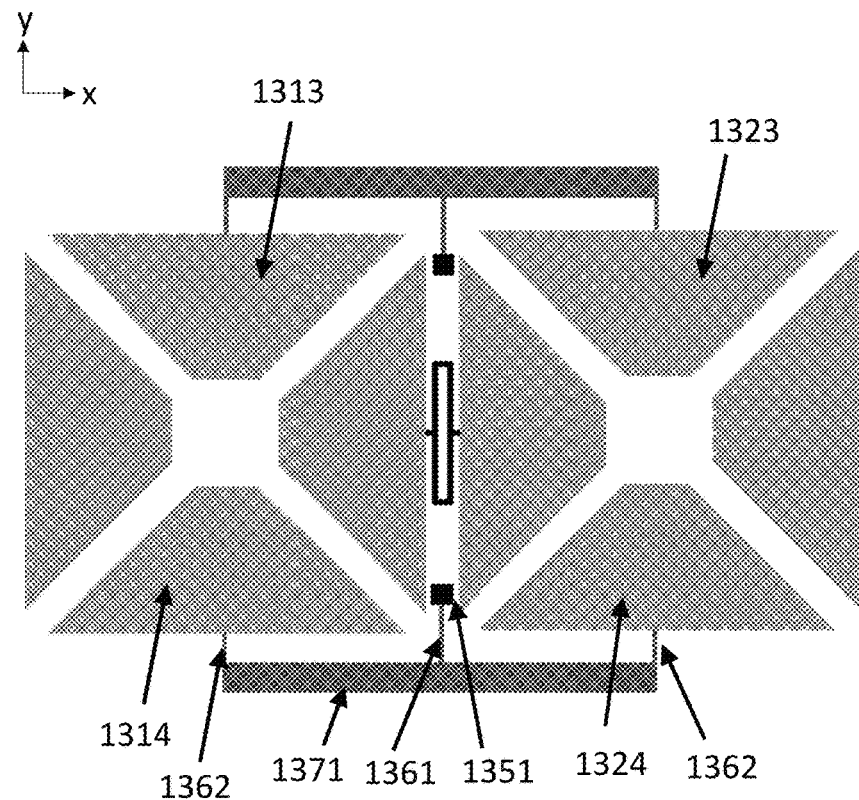
FIGS. 13a-13b also illustrate synchronization arrangements between the first and second proof mass quartets.

Other proof masses in the proof mass quartets can be connected with peripheral synchronization elements, for example of the kind illustrated in FIG. 13a. Reference numbers 1311-1314 and 1321-1324 correspond to reference numbers 211-214 and 221-224 in FIGS. 2a-2e and to reference numbers 311-314 and 321-324 in FIGS. 3a-3b, respectively.

As illustrated in FIG. 13a, the synchronization structure comprises an upper part above the lateral axis and a separate lower part below the lateral axis. Only the lower part will be described in detail. The same considerations apply to the upper part as well.

The lower synchronization structure illustrated in FIG. 13a comprises an anchor point 1351 aligned on the third transversal axis. The anchor point 1351 may, but does not have to, be located between the fourth proof mass 1314 of the first quartet and the fourth proof mass 1324 of the second quartet. It may also be located outer side of the synchronization structure. The structure further comprises a relatively rigid lateral seesaw 1371 which is connected to the anchor point 1351 and to proof masses 1314 and 1324 with transversal torsion/flexure bars 1361-1362. These torsion/flexure bars are flexible for in-plane bending and for twisting, but they are rigid for out-of-plane bending. These torsion/flexure bars allow the lateral seesaw 1371 to rotate about the third transversal axis, and thereby to synchronize the movement of the fourth proof masses 1314 and 1324 in the x-axis and y-axis secondary oscillation modes.

The upper synchronization structure can correspondingly synchronize the movement of the third proof masses 1313 and 1323. Torsion/flexure bars 1361-1362 may also resist the linear movement of the lateral seesaw 1371 along the vertical axis, and thereby prevent the out-of-plane cophasal oscillation mode of the fourth proof masses 1314 and 1324. The upper synchronization structure can correspondingly resist the cophasal out-of-plane oscillation of the third proof masses 1313 and 1323.

Torsion/flexure bars 1361-1362 may also allow the lateral seesaw 1371 to rotate about a vertical axis, and thereby to synchronize the radial in-plane anti-phase oscillation of the fourth proof masses 1314 and 1324 illustrated in FIGS. 2a and 3b. The upper synchronization structure can correspondingly synchronize the in-plane anti-phase oscillation of the third proof masses 1313 and 1323. Torsion/flexure bars 1361-1362 may also resist the linear movement of the lateral seesaw 1371 along a transversal axis, and thereby prevent the radial in-plane cophasal oscillation mode of the fourth proof masses 1314 and 1324. The upper synchronization structure can correspondingly resist the in-plane cophasal oscillation of the third proof masses 1313 and 1323.

Torsion/flexure bars 1362 are flexible for in-plane bending and may therefore allow the in-plane tangential anti-phase oscillation of the proof masses 1314 and 1324 illustrated in FIGS. 2b and 3a, but they do no not synchronize, nor do they prevent the corresponding cophasal oscillation. The upper synchronization structure can correspondingly allow the in-plane tangential anti-phase oscillation of the third proof masses 1313 and 1323, but not synchronize it or prevent the corresponding cophasal oscillation.

Figure 13B:
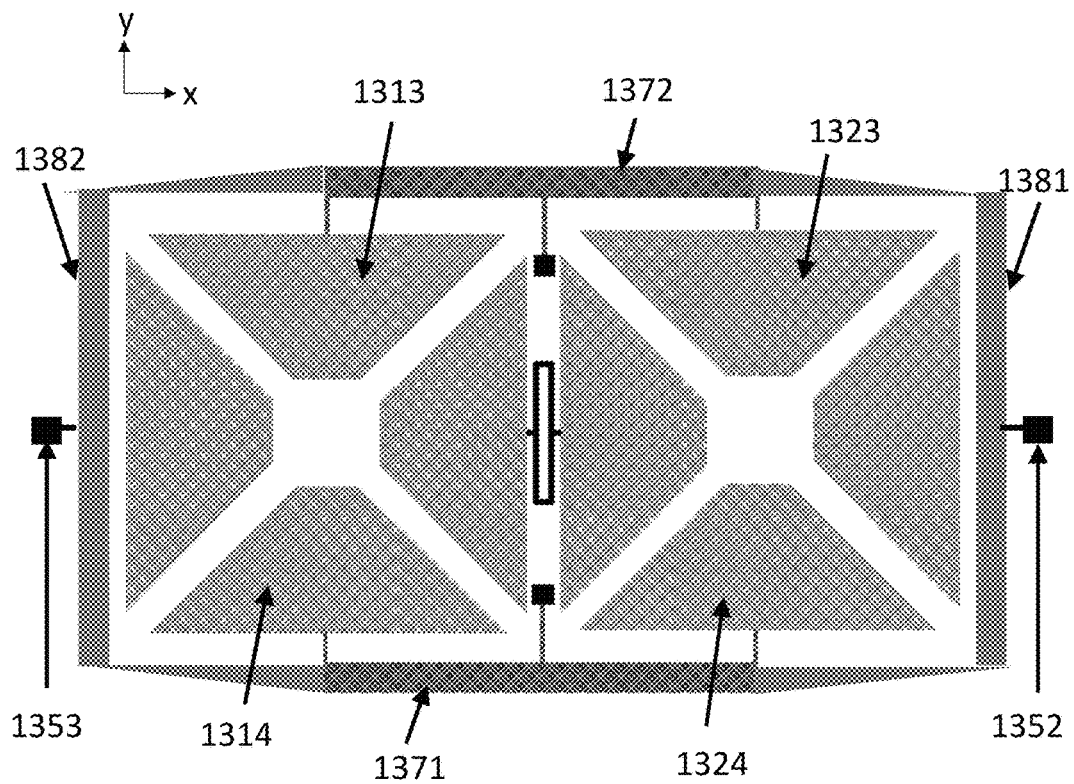

FIG. 13b illustrates an expanded peripheral synchronization structure which comprises a first lateral seesaw 1371 and a second lateral seesaw 1372 as described above with reference to FIG. 13a. The structure further comprises two lateral anchor points 1352 and 1353 on opposite sides of the gyroscope. A first transversal seesaw 1381 is attached to the first lateral anchor point 1352 with a torsion bar, and a second transversal seesaw 1382 is attached to the second lateral anchor point 1353 with a torsion bar.

The ends of these transversal seesaws 1381 and 1382 are attached to the ends of the lateral seesaws 1371 and 1372 in the manner illustrated in FIG. 13b, so that the seesaws together form a frame-shaped structure around the proof mass quartets. This allows the out-of-plane oscillation of proof mass pair 1313+1314 to be synchronized into anti-phase with the out-of-plane oscillation of proof mass pair 1323+1324 in the x-axis and y-axis secondary oscillation modes.

Out-of-plane oscillation may also be synchronized by other means not illustrated in this disclosure.

Drive and Sense Transducers

Capacitive or piezoelectric drive transducers may be incorporated in the gyroscope to facilitate primary oscillation. The gyroscope may comprise a control unit which is configured to apply a drive voltage signal to the drive transducers. The frequency of the drive voltage signals may in part determine the resonance frequency of the primary oscillation mode, and the amplitude of the drive voltage signals may in part determine the amplitude of the primary oscillation mode. The same drive voltage signal may be applied to multiple drive transducers. Alternatively, two separate drive voltage signals may be used, and the phase difference between the first drive voltage signal and the second drive voltage signal may be 180 degrees. The first drive voltage signal may be applied to drive transducers in the first proof mass quartet, and the second drive voltage signal may be applied to drive transducers in the second proof mass quartet. Different drive voltage signals may also be applied to masses in the same proof mass quartet. Many other drive signal alternatives are also possible for driving the primary oscillation.

Capacitive or piezoelectric sense transducers may be incorporated in the gyroscope to measure secondary oscillation modes induced by the Coriolis force. The control unit may be configured to measure a sense voltage signal from the sense transducers. The amplitude of the sense voltage signal may be used to calculate the corresponding angular rotation rate. The sense voltage signal may be generated as a sum of several sense signal components retrieved from separate sense transducers.

Figure 14A:
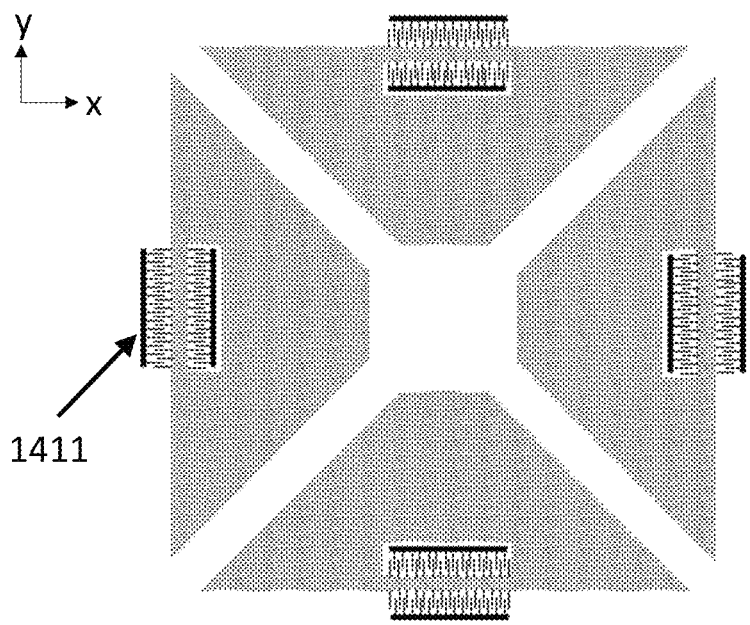
FIGS. 14a-14b illustrate the placement of capacitive drive or sense transducers for in-plane oscillation.

FIG. 14a illustrates a proof mass quartet with four capacitive outer drive transducers 1411. Each transducer comprises a set of rotor finger electrodes on the partly mobile proof masses and a set of stator finger electrodes on an adjacent fixed structure (the fixed structure is not illustrated). In this geometry, the capacitive drive transducers may be used to drive the first primary oscillation mode.

Figure 14B:
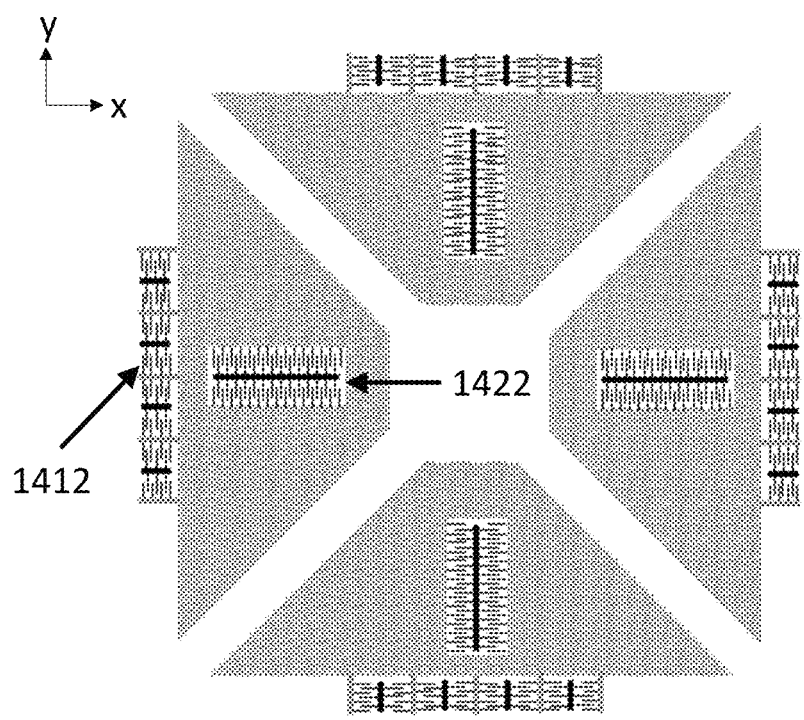

FIG. 14b illustrates a proof mass quartet with four capacitive outer drive transducers 1412 and four capacitive inner drive transducers 1422. The inner drive transducers are located in an opening formed within the respective proof mass. In this geometry, the capacitive drive transducers may be used to drive the second primary oscillation mode.

Figure 15A:
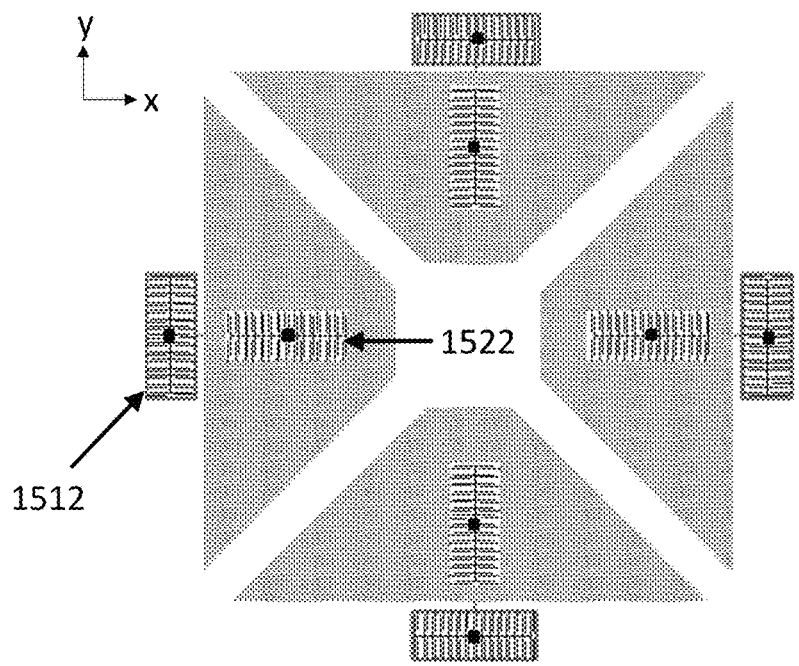
FIGS. 15a-15b illustrate the placement of capacitive drive or sense transducers for out-of-plane oscillation.

Similar arrangements can be made for sense transducers. FIG. 15a illustrates a proof mass quartet with four capacitive outer sense transducers 1512 and four capacitive inner sense transducers 1522. When some sense transducers are equipped with fingers oriented in the lateral direction, and others with fingers oriented in the transversal direction, both radial and tangential in-plane movement can be detected.

Figure 15B:
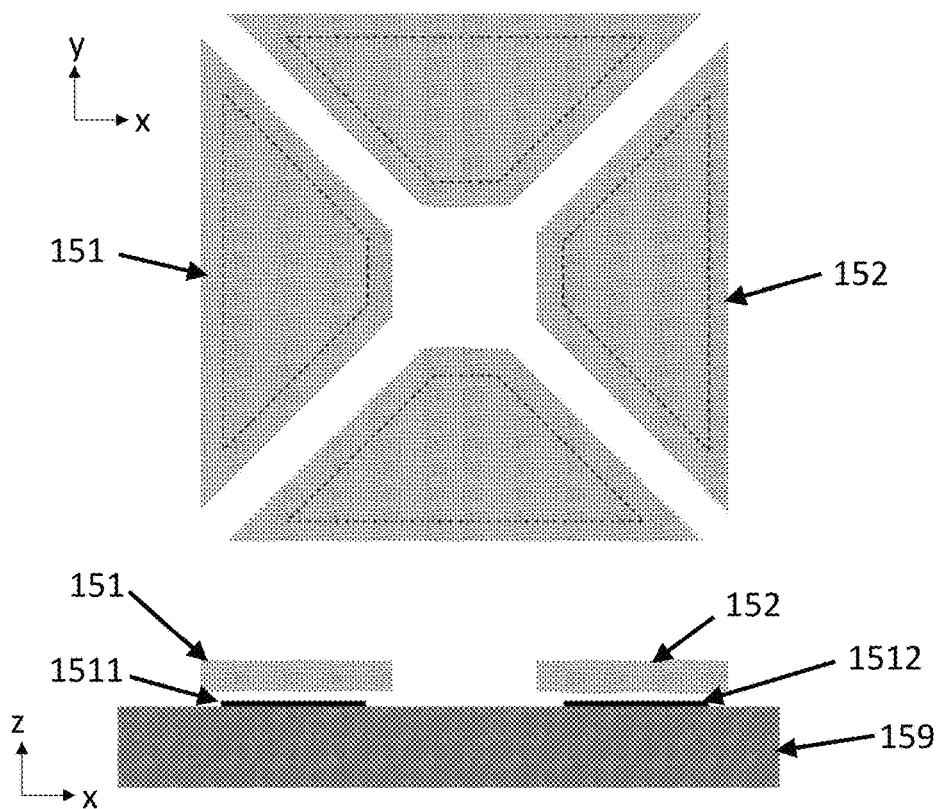

FIG. 15b illustrates a proof mass quartet with first proof mass 151, second proof mass 152, and capacitive sense transducers for detecting out-of-plane oscillation. The sense transducers comprise planar electrodes above and/or below the proof masses. In the upper figure, the locations of the planar electrodes are illustrated with dashed lines. The area of the planar electrodes may be contained within the area of the proof masses, as illustrated in FIG. 15b, or the area of the proof masses may be contained within the area of the planar electrodes. The overlap between these areas should preferably not change when the masses undergo in-plane oscillation, since this might add undesired modulation to the out-of-plane sense signal.

The lower part of FIG. 15b illustrates planar electrodes 1511 and 1512 on the surface of a supporting substrate 159. Opposing planar electrodes (not illustrated) may be formed on the proof masses 151 and 152 so that a capacitive parallel-plate measurement can be performed when the x-axis and y-axis secondary modes are detected. Alternatively, the proof masses 151 and 152 may themselves be used as the second planar electrodes of the capacitive sense transducers.

The invention claimed is:

1. A microelectromechanical gyroscope, comprising:
a first proof mass quartet and a second proof mass quartet in a device plane, with a corresponding first quartet center point and a corresponding second quartet center point which lie on a lateral axis,
wherein four proof masses which form the first proof mass quartet are in their rest position symmetrically arranged around the first quartet center point where the lateral axis crosses a first transversal axis orthogonally in the device plane, and four proof masses which form the second proof mass quartet are in their rest position symmetrically arranged around the second quartet center point where the lateral axis crosses a second transversal axis orthogonally in the device plane, and wherein first and second proof masses in each proof mass quartet are aligned on the lateral axis in their rest position, and third and fourth proof masses in the first proof mass quartet are aligned on the first transversal axis in their rest position, and third and fourth proof masses in the second proof mass quartet are aligned on the second transversal axis in their rest position, and the relative positions of the first, second, third and fourth proof masses in relation to the corresponding quartet center point are the same in both quartets, and the second proof mass in the first proof mass quartet is adjacent and mechanically coupled to the first proof mass in the second proof mass quartet, the gyroscope further comprising one or more drive transducers for setting the first and second proof mass quartets into primary oscillating motion, and one or more sense transducers for detecting secondary oscillating motion of the first and second proof mass quartets which is induced by the Coriolis force if the gyroscope undergoes angular rotation, and a suspension arrangement for suspending the first and second proof mass quartets from a fixed support structure, wherein the suspension structure is configured to accommodate the primary and secondary oscillating motion of the first and second proof mass quartets, and wherein the drive transducers are configured to set all four proof masses in each proof mass quartet into primary oscillation in the device plane either in a first primary oscillation mode or in a second primary oscillation mode, wherein in the first primary oscillation mode, all proof masses in the first proof mass quartet move together radially in the device plane toward and away from the first quartet center point, and all proof masses in the second proof mass quartet move together radially toward and away from the second quartet center point, and all proof masses in the first proof mass quartet move radially in the device plane toward the first quartet center point when all proof masses in the second proof mass quartet move radially away from the second proof mass quartet, and vice versa, and in the second primary oscillation mode all proof masses in the first proof mass quartet move together tangentially in the device plane, clockwise and counter-clockwise in relation to the first quartet center point, and all proof masses in the second proof mass quartet move together tangentially in the device plane, clockwise and counter-clockwise in relation to the second quartet center point, and all proof masses in the first proof mass quartet move tangentially in the device plane, clockwise in relation to the first quartet center point when all proof masses in the second proof mass quartet move tangentially in the device plane, counter-clockwise in relation to the second proof mass quartet, and vice versa, and the secondary oscillation modes of the first and second proof mass quartets include a z-axis secondary mode, an x-axis secondary mode, or a y-axis secondary mode, wherein if the primary oscillation mode is the first primary oscillation mode, in response to rotation of the gyroscope about a z-axis which is perpendicular to the device plane, the z-axis secondary mode is the same as the second primary oscillation mode, in response to rotation of the gyroscope about an x-axis which is parallel to the lateral axis, the x-axis secondary mode comprises motion where the two proof mass pairs formed by the third and fourth proof masses in each proof mass quartet oscillate tangentially out of the device plane, in response to rotation of the gyroscope about a y-axis which is parallel to the first and second transversal axes, the y-axis secondary mode comprises motion where the two proof mass pairs formed by the first and second proof masses in each proof mass quartet oscillate tangentially out of the device plane, and wherein, if the primary oscillation mode of each proof mass quartet is the second primary oscillation mode, in response to rotation of the gyroscope about the z-axis, the z-axis secondary mode is the same as the first primary oscillation mode, in response to rotation of the gyroscope about the x-axis, the x-axis secondary mode comprises motion where the two proof mass pairs formed by the first and second proof masses in each proof mass quartet oscillate tangentially out of the device plane, in response to rotation of the gyroscope about the y-axis, the y-axis secondary mode comprises motion where the two proof mass pairs formed by the third and fourth proof masses in each proof mass quartet oscillate tangentially out of the device plane.

2. The microelectromechanical gyroscope according to claim 1, wherein the out-of-plane oscillation of at least one proof mass pair in both the x-axis secondary mode and the y-axis secondary mode comprises a rotational component.

3. The microelectromechanical gyroscope according to claim 2, wherein the second proof mass in the first proof mass quartet is mechanically coupled to the first proof mass in the second proof mass quartet by at least one coupling spring which allows the second proof mass in the first proof mass quartet and the first proof mass in the second proof mass quartet to simultaneously rotate in opposite out-of-plane directions about corresponding transversal axes.

4. The microelectromechanical gyroscope according to claim 2, wherein the at least one coupling spring allows the second proof mass in the first proof mass quartet and the first proof mass in the second proof mass quartet to simultaneously rotate in opposite in-plane directions about corresponding vertical axes.

5. The microelectromechanical gyroscope according to claim 2, wherein the at least one coupling spring allows simultaneous cophasal linear translation of the second proof mass in the first proof mass quartet and the first proof mass in the second proof mass quartet in a direction parallel to the lateral axis, parallel to any transversal axis, or parallel to any vertical axis.

6. The microelectromechanical gyroscope according to claim 2, wherein the at least one coupling spring resists simultaneous anti-phase linear translation of the second proof mass in the first proof mass quartet and the first proof mass in the second proof mass quartet in opposite directions parallel to any transversal axis or parallel to any vertical axis.

7. The microelectromechanical gyroscope according to claim 2, wherein the at least one coupling spring resists simultaneous rotation of the second proof mass in the first proof mass quartet and the first proof mass in the second proof mass quartet in opposite directions about the lateral axis.

8. The microelectromechanical gyroscope according to claim 1, wherein the suspension arrangement comprises a first central suspension arrangement which suspends the first proof mass quartet from a first central anchor point located at the first quartet center point, and the suspension arrangement also comprises a second central suspension arrangement which suspends the second proof mass quartet from a second central anchor point located at the second quartet center point, and at least one of the first and second central suspension arrangements is centered around the corresponding first or second central anchor point where a c1-axis crosses a c2-axis orthogonally, so that the c1-axis is either lateral or transversal, and said central suspension arrangement comprises a central gimbal element surrounded by a central synchronization element, wherein the central gimbal element comprises inner torsion springs which extend from the corresponding central anchor point to a gimbal frame and outer torsion springs which extend from the gimbal frame to the central synchronization element, and the central synchronization element comprises first and second c1-torsion bars which extend in opposite directions along the c1-axis to the two proof masses aligned on the c1-axis in the proof mass quartet which surrounds said central synchronization element, and the central synchronization element comprises first and second c2-torsion bars which extend in opposite directions along the c2-axis to the two proof masses that are aligned on the c2-axis in the proof mass quartet which surrounds said central synchronization element.

9. The microelectromechanical gyroscope according to claim 8, wherein the central synchronization element comprises first and second rigid bodies aligned on the c1-axis on opposite sides of the central gimbal element so that the first end of the first rigid body lies opposite to the first end of the second rigid body, and the second end of the first rigid body lies opposite to the second end of the second rigid body, and the outer torsion springs of the central gimbal element extend to the first and second rigid bodies, respectively, and the first and second c1-torsion bars are attached to the first and second rigid bodies, respectively, wherein the central synchronization element also comprises a first flexure which extends from the first end of the first rigid body to the first c2-torsion bar, and a second flexure which extends from the first end of the second rigid body to the first c2-torsion bar, and a third flexure which extends from the second end of the first rigid body to the second c2-torsion bar, and a fourth flexure which extends from the second end of the second rigid body to the second c2-torsion bar.

10. The microelectromechanical gyroscope according to claim 8, wherein the central synchronization element comprises a rigid central synchronization frame which surrounds the gimbal frame, and the outer torsion springs of the central gimbal element extend to the central synchronization frame, and the central synchronization element comprises first and second rigid bodies aligned on the c1-axis on opposite sides of the central synchronization frame, so that the first end of the first rigid body lies opposite to the first end of the second rigid body, and the second end of the first rigid body lies opposite to the second end of the second rigid frame, wherein the first end of the first rigid body is joined to the first end of the second rigid body with a first U-shaped flexure aligned on the c2-axis, and the second end of the first rigid body is joined to the second end of the second rigid body with a second U-shaped flexure aligned on the c2-axis, and the first c2-torsion bar is attached to the bottom of the first U-shaped flexure, and the second c2-torsion bar is attached to the bottom of the second U-shaped flexure, and wherein the central synchronization element also comprises a first flexure which extends from the central synchronization frame to a first branch of the first U-shaped flexure, and a second flexure which extends from the central synchronization frame to the second branch of the first U-shaped flexure, and a third flexure which extends from the central synchronization frame to a first branch of the second U-shaped flexure, and a fourth flexure which extends from the central synchronization frame to the second branch of the second U-shaped flexure.

11. The microelectromechanical gyroscope according to claim 8, wherein the central synchronization element comprises first and second rigid bodies aligned on the c1-axis on opposite sides of the central gimbal element so that the first end of the first rigid body lies opposite to the first end of the second rigid body, and the second end of the first rigid body lies opposite to the second end of the second rigid body, and third and fourth rigid bodies aligned on the c2-axis on opposite sides of the central gimbal element so that the first end of the third rigid body lies opposite to the first end of the fourth rigid body, and the second end of the third rigid body lies opposite to the second end of the fourth rigid body, wherein the first and second c1-torsion bars are attached to the first and second rigid bodies, respectively, and the first and second c2-torsion bars are attached to the third and fourth rigid bodies, respectively, and the central synchronization element comprises a substantially quadratic flexible central synchronization frame which surrounds the gimbal frame, and the outer torsion springs of the central gimbal element extend along either the c1-axis or the c2-axis to two opposing corners in the quadratic flexible central synchronization frame, and the central synchronization element further comprises four pairs of push bars, wherein each pair of push pars is parallel and extends from the two opposing ends of one of the first, second third or fourth rigid bodies to the midpoints of the adjacent sides of the quadratic flexible central synchronization frame.

12. The microelectromechanical gyroscope according to claim 1, wherein the suspension arrangement comprises a first peripheral suspension arrangement which suspends the first proof mass quartet from one or more first peripheral anchor points, and the suspension arrangement also comprises a second peripheral suspension arrangement which suspends the second proof mass quartet from one or more second peripheral anchor points, and at least one of the first and second peripheral suspension arrangements comprises four corner elements placed around the perimeter of the proof mass quartet symmetrically in relation to the gyroscope center point, wherein each pair of adjacent corner elements is interconnected with one or more peripheral suspenders, and said one or more peripheral suspenders are attached to the adjacent proof mass wherein each corner element is suspended from one or more peripheral anchor points by a radially flexible suspender.

* * * * *

UNITED STATES PATENT AND TRADEMARK OFFICE
CERTIFICATE OF CORRECTION

PATENT NO. : 11,105,630 B2  
APPLICATION NO. : 16/793141  
DATED : August 31, 2021  
INVENTOR(S) : Heikki Kuisma et al.

Page 1 of 1

It is certified that error appears in the above-identified patent and that said Letters Patent is hereby corrected as shown below:

In the Claims

Claim 1, Column 25, Line 47:  
Please change "proof mass quartet" to --quartet center point--; and Claim 1, Column 25, Line 62:  
Please change "proof mass quartet" to --quartet center point--.

Signed and Sealed this  
Second Day of August, 2022

Katherine Kelly Vidal  
*Director of the United States Patent and Trademark Office*